US012788000B2

(12) United States Patent
Williams et al.

(10) Patent No.: US 12,788,000 B2
(45) Date of Patent: Nov. 10, 2026

(54) FLUID LINE AGITATION SYSTEM AND METHOD THEREOF

(71) Applicant: DEERE & COMPANY, Moline, IL (US)

(72) Inventors: David L. Williams, Huxley, IA (US); Richard L. Killion, Jefferson, IA (US)

(73) Assignee: Deere & Company, Moline, IL (US)

( * ) Notice: Subject to any disclaimer, the term of this patent is extended or adjusted under 35 U.S.C. 154(b) by 382 days.

(21) Appl. No.: 18/365,285

(22) Filed: Aug. 4, 2023

(65) Prior Publication Data

US 2024/0099289 A1 Mar. 28, 2024

Related U.S. Application Data

(60) Provisional application No. 63/409,471, filed on Sep. 23, 2022.

(51) Int. Cl.
*A01M 7/00* (2006.01)
*B05B 12/00* (2018.01)

(52) U.S. Cl.
CPC ........ *A01M 7/0089* (2013.01); *A01M 7/0085* (2013.01); *B05B 12/008* (2013.01)

(58) Field of Classification Search
CPC .......................... A01M 7/0089; A01M 7/0085
See application file for complete search history.

(56) References Cited

U.S. PATENT DOCUMENTS 4,867,192 A * 9/1989 Terrell ................. A01C 23/042 239/69
5,227,068 A * 7/1993 Runyon ................ B01F 23/234 239/10
7,845,914 B2 * 12/2010 Engelbrecht ............ F04D 13/12 417/303
10,306,879 B2 * 6/2019 Proharam ........... A01M 7/0092
10,334,776 B2 * 7/2019 Bouten ............... A01M 7/0092
2006/0086296 A1 * 4/2006 Wichmann ........... A01C 23/042 111/127
2017/0006852 A1 * 1/2017 Engelbrecht ........ A01M 7/0089
2018/0369851 A1 * 12/2018 Engelbrecht .............. B05B 1/20
2019/0022687 A1 * 1/2019 Brooks ............... A01M 7/0089
2020/0390079 A1 * 12/2020 Brooks ................... B05B 12/04
2022/0016680 A1 * 1/2022 Schell ................. A01M 7/0085
2023/0019528 A1 * 1/2023 Pitaud .................. A01C 23/007
2023/0354799 A1 * 11/2023 Bharatiya ............. B05B 9/0423
2024/0099289 A1 * 3/2024 Williams ............ A01M 7/0085

* cited by examiner

*Primary Examiner* — Joseph A Greenlund
(74) *Attorney, Agent, or Firm* — Taft Stettinius & Hollister LLP; Stephen F. Rost

(57) ABSTRACT

A multi-tank system for delivering product to a spray section includes a first tank, a second tank, and a first pump. A plurality of valves includes a first sump valve, a second sump valve, an equalizing valve, and an agitation valve. A first end of the first sump valve is in fluid communication with the first tank, a second end of the first sump valve is in fluid communication with (i) a first end of the equalizing valve and (ii) an inlet of the first pump. The plurality of fluid lines includes a first fluid line and a second fluid line. A third fluid line is fluidly coupled at one end downstream of the first pump and at another end to the first sump valve or the first end of the equalizing valve.

13 Claims, 17 Drawing Sheets

FLUID LINE AGITATION SYSTEM AND METHOD THEREOF

This application claims the benefit of U.S. Provisional Patent Application Ser. No. 63/409,471, filed Sep. 23, 2022, the disclosure of which is hereby incorporated by reference in its entirety.

FIELD OF THE DISCLOSURE

The present disclosure relates to an agricultural sprayer, and in particular, to a fluid line agitation system in a sprayer control system.

BACKGROUND

Agricultural machines, such as a sprayer, may include a reservoir for holding a product to be dispensed during a spraying operation. The machine may include one or more fluid lines coupled to the reservoir for transporting the product to a location on the machine where it is dispensed.

SUMMARY

In one implementation of the present disclosure, a valve of a spray system having a fluid delivery circuit and an agitating circuit includes a body forming a cavity configured to receive fluid. The body includes an inlet and an outlet. The valve includes a control portion and a ball, the ball being located in the cavity and configured to be moved relative to the body via the control portion. The valve also includes a fluid port coupled to the body and spaced from the inlet and the outlet, where the fluid port is configured to be fluidly coupled to the agitating circuit. The inlet and outlet are configured to be fluidly coupled to the fluid delivery circuit, and the control portion is configured to move the ball between at least a first position and a second position. In the first position, the inlet is closed from receiving a fluid from the fluid delivery circuit and in the second position the inlet is open for receiving fluid from the fluid delivery circuit. The fluid port is oriented with respect to the body so that it is configured to inject a pressurized fluid into the cavity independent of the position of the ball.

In one example, the fluid port is oriented towards a lower portion of the cavity. In a second example, the fluid port is located towards a lower portion of the cavity. In a third example, the fluid port is angled relative to the body towards a lower portion of the cavity. In another example, the fluid port is located in a side wall of the body and is configured to inject the pressurized fluid in a direction that is 90° or less relative to a direction of fluid received in the inlet.

In another implementation of the present disclosure, a method is provided for controlling a flow of fluid in a fluid line of a hydraulic circuit. The method includes directing fluid via a pump through the fluid line, detecting with a sensor a flow characteristic of the fluid flowing through the fluid line, comparing the flow characteristic to a threshold, identifying a dead spot in the fluid line based on the comparing step, introducing pressurized fluid at or adjacent to the dead spot in the fluid line, and agitating the fluid in the fluid line at the dead spot via the pressurized fluid.

In one example of this implementation, the detecting step includes detecting a flow rate of the fluid flowing through the fluid line. In a second example, the detecting step includes detecting a pressure of the fluid flowing through the fluid line. In a third example, the detecting step includes detecting a pressure drop of the fluid flowing through the fluid line. In another example, the introducing step includes injecting pressurized fluid from a second fluid line through a fitting coupled to the fluid line. In a further example, the pressurized fluid is injected into the fluid line at an angle relative to the fluid line. In yet another example, the identifying step includes locating the dead spot is in a valve, and injecting pressurized fluid into a valve body of the valve.

In a further implementation of the present disclosure, a multi-tank system for delivering product to a spray section includes a first tank configured to contain a first product, a second tank configured to contain a second product, a first pump, and a plurality of valves including a first sump valve, a second sump valve, an equalizing valve, and an agitation valve. A first end of the first sump valve is in fluid communication with the first tank, a second end of the first sump valve is in fluid communication with (i) a first end of the equalizing valve and (ii) an inlet of the first pump, a first end of the second sump value is in fluid communication with the second tank, and a second end of the second sump valve is in fluid communication with a second end of the equalizing valve. A plurality of fluid lines includes a first fluid line, a second fluid line, and a third fluid line. The first fluid line is fluidly coupled between an outlet of the first pump and a first end of the agitation valve, and the second fluid line is fluidly coupled between a second end of the agitation valve and the first tank. The third fluid line is fluidly coupled at one end downstream of the first pump and at another end to the first sump valve or the first end of the equalizing valve.

In one example of this implementation, the third fluid line is directly fluidly coupled to the first fluid line. In a second example, the third fluid line is directly fluidly coupled to the second fluid line. In a third example, the third fluid line is fluidly coupled to a fourth fluid line, the third fluid line being fluidly coupled to the first sump valve and the fourth fluid line being fluidly coupled to the first end of the equalizing valve. In another example, the agitation valve is operably controlled between a first position and a second position, where in the first position the third fluid line is fluidly coupled to the outlet of the first pump and in the second position the third fluid line is fluidly decoupled from the outlet of the first pump.

In a further example, the system includes a controller disposed in communication with each of the plurality of valves and is configured to actuate each of the plurality of valves between an open position and a closed position. In yet a further example, the plurality of valves includes a second agitation valve and the plurality of fluid lines includes a fifth fluid line and a sixth fluid line. The fifth fluid line is fluidly coupled between an outlet of the second pump and a first end of the second agitation valve and the sixth fluid line is fluidly coupled between a second end of the second agitation valve and the second tank. A seventh fluid line is fluidly coupled at one end downstream of the second pump and at another end to the second sump valve or the second end of the equalizing valve. In yet another example, the seventh fluid line is fluidly coupled to an eighth fluid line, the seventh fluid line being fluidly coupled to the second sump valve and the eighth fluid line being fluidly coupled to the second end of the equalizing valve.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

Corresponding reference numerals are used to indicate corresponding parts throughout the several views.

DETAILED DESCRIPTION

Figure 1:
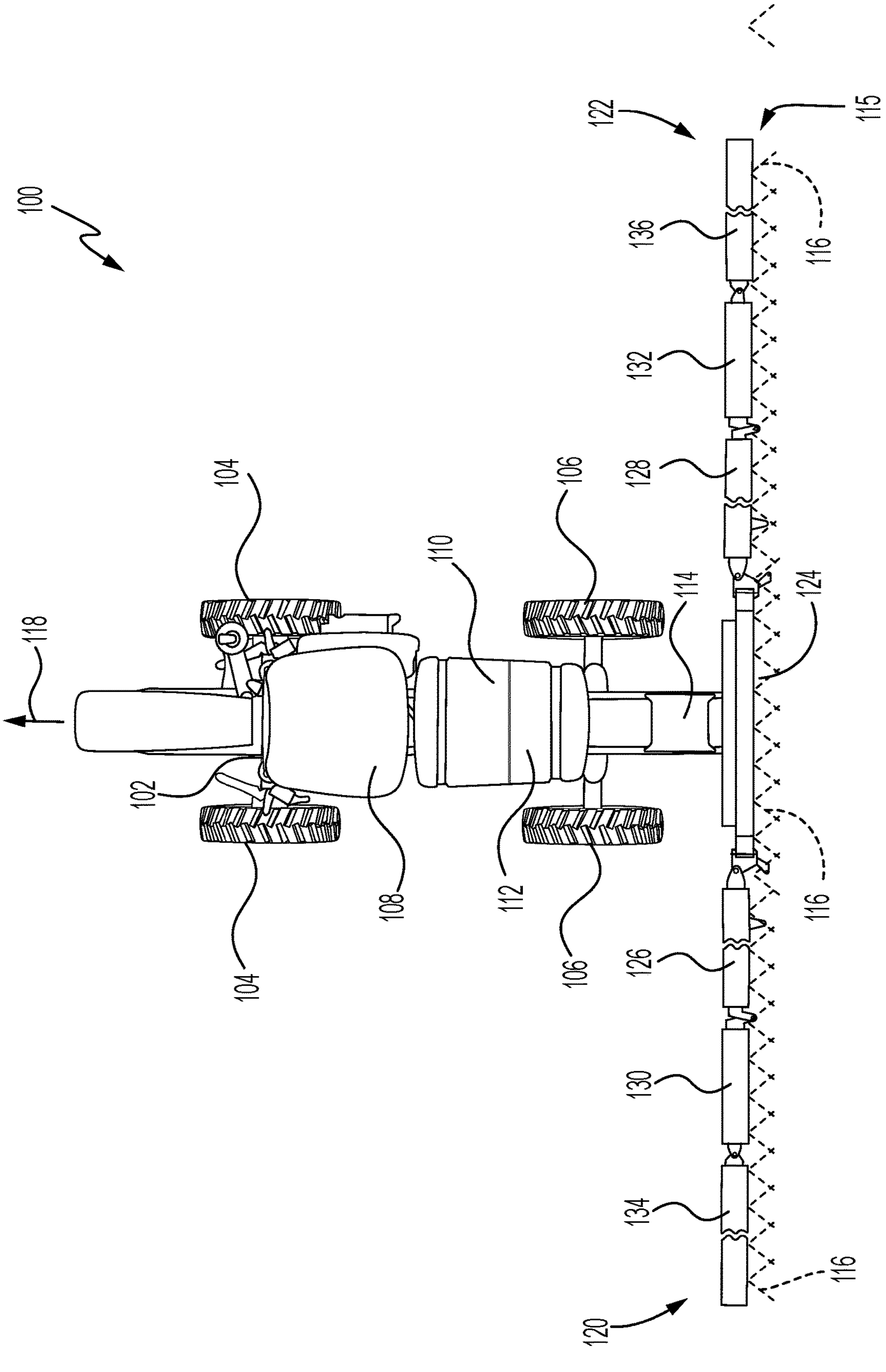
FIG. 1 is a top view of a sprayer system attached to a work machine.

For the purposes of promoting an understanding of the principles of the present disclosure, reference will now be made to the implementations described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Referring to FIG. 1, an example of an agricultural work machine carrying a spray boom with spray nozzles mounted on the boom. The machine may be a platform or dolly for industrial spray applications or a tractor towing ground-engaging tillage left/right wings with disks and shanks, or a planter towing a row of seed dispenser modules. In the illustrated implementation of FIG. 1, the machine may be a towed sprayer or a self-propelled agricultural sprayer 100 including a main frame 102 and an attached autonomous control station or an operator cab 108 for controlling the sprayer 100. The main frame 102 may be supported by a plurality of ground-engaging mechanisms. In FIG. 1, a pair of front wheels 104 and a pair of rear wheels 106 support the main frame and may propel the vehicle in at least a forward travel direction 118. A first tank 110 and a second tank may be mounted to the frame 102 or another frame (not shown) which is attached to the main frame 102. The first tank 110 and second tank 112 may contain a spray liquid, a fertilizer, a pesticide, a granular product, or other substance to be discharged during a spraying operation. In some implementations, the first tank 110 and the second tank 112 may be two separate tanks. In other implementations, the first tank 110 and the second tank 112 may be different portions, e.g., sealed compartments, of a single tank. Although only two tanks are shown in FIG. 1, the self-propelled agricultural sprayer 100 may include more than two tanks, e.g., three or more tanks.

A fixed or floating center frame 114 is coupled to a front or a rear of the main frame 102. In FIG. 1, the center frame 114 is shown coupled to the rear of the main frame 102. The center frame 114 may support an articulated folding spray boom assembly 115 that is shown in FIG. 1 in its fully extended working position for spraying a field. In other examples, the spray boom assembly 115 may be mounted in front of the agricultural sprayer 100.

A plurality of spray nozzles 116 can be mounted along a fluid distribution pipe or spray pipe (not shown) that is mounted to the spray boom assembly 115 and fluidly coupled to the first tank 110 and/or second tank 112. Each nozzle 116 can have multiple spray outlets, each of which conducts fluid to a same-type or different-type of spray tip. The nozzles 116 on the spray boom assembly 115 can be divided into boom frames or wing structures such as 124, 126, 128, 130, 132, 134, and 136 (or collectively "spray section(s)"). In FIG. 1, the plurality of groups or sections may include a center boom frame 124 which may be coupled to the center frame 114. Although not shown in FIG. 1, a lift actuator may be coupled to the center frame 114 at one end and to the center boom frame 124 at the opposite end for lifting or lowering the center boom frame 124.

The spray boom assembly 115 may be further divided into a first or left boom 120 and a second or right boom 122. In FIG. 1, the first boom 120 is shown on a left side of the spray boom assembly 115, and the second boom 122 is depicted on the right side thereof. In some instances, a left-most portion of the center boom frame 124 may form part of the first boom 120 and a right-most portion may form part of the second boom 122. In any event, the first boom 120 may include those boom frames which are disposed on a left-hand side of the spray boom assembly 112 including a first inner boom frame 126 (or commonly referred to as a "left inner wing"), a first outer boom frame 130 (or commonly referred to as a "lift outer wing"), and a first breakaway frame 134. Similarly, the second boom 122 may include those boom frames which are disposed on a right-hand side of the spray boom assembly 115 including a second inner boom frame 128 (or commonly referred to as a "right inner wing"), a second outer boom frame 132 (or commonly referred to as a "right outer wing"), and a second breakaway frame 136. Although seven boom frames are shown, there may any number of boom frames that form the spray boom assembly 115.

As shown in FIG. 1, the first boom frame 126 may be pivotally coupled to the center boom frame 124 via various mechanical couplings. Other means for coupling the first boom frame 126 to the center boom frame 124 may be used. Similarly, the first outer boom frame 130 may be coupled to the first inner boom frame 126, and the first breakaway frame 134 may be coupled to the first outer boom frame 130. In some cases, these connections may be rigid connections, whereas in other implementations the frames may be pivotally coupled to one another. Moreover, the second inner boom frame 128 may be coupled to the center boom frame 124, and the second outer boom frame 132 may be coupled to the second inner boom frame 128. Likewise, the second breakaway frame 136 may be coupled to the second outer boom frame 136. These couplings may be pivotal connections or rigid connections depending upon the type of boom.

In a conventional spray boom assembly, a tilt actuator may be provided for tilting each boom with respect to the center frame. In FIG. 1, for example, a first tilt actuator may be coupled at one end to the center frame 114 or the center boom frame 124, and at an opposite end to the first boom 120. During operation, the first boom 120 may be pivoted with respect to the center frame 114 or center boom frame 124 such that the first breakaway frame 134 may reach the highest point of the first boom 120. This may be useful if the sprayer 100 is moving in the travel direction 118 and an object is in the path of the first boom 120 such that the tilt actuator (not shown) may be actuated to raise the first boom 120 to avoid contacting the object. The same may be true of the second boom 122. Here, a second tilt actuator (not shown) may be actuated to pivot the second boom 122 with respect to the center frame 114 or the center boom frame 124.

Figure 2:
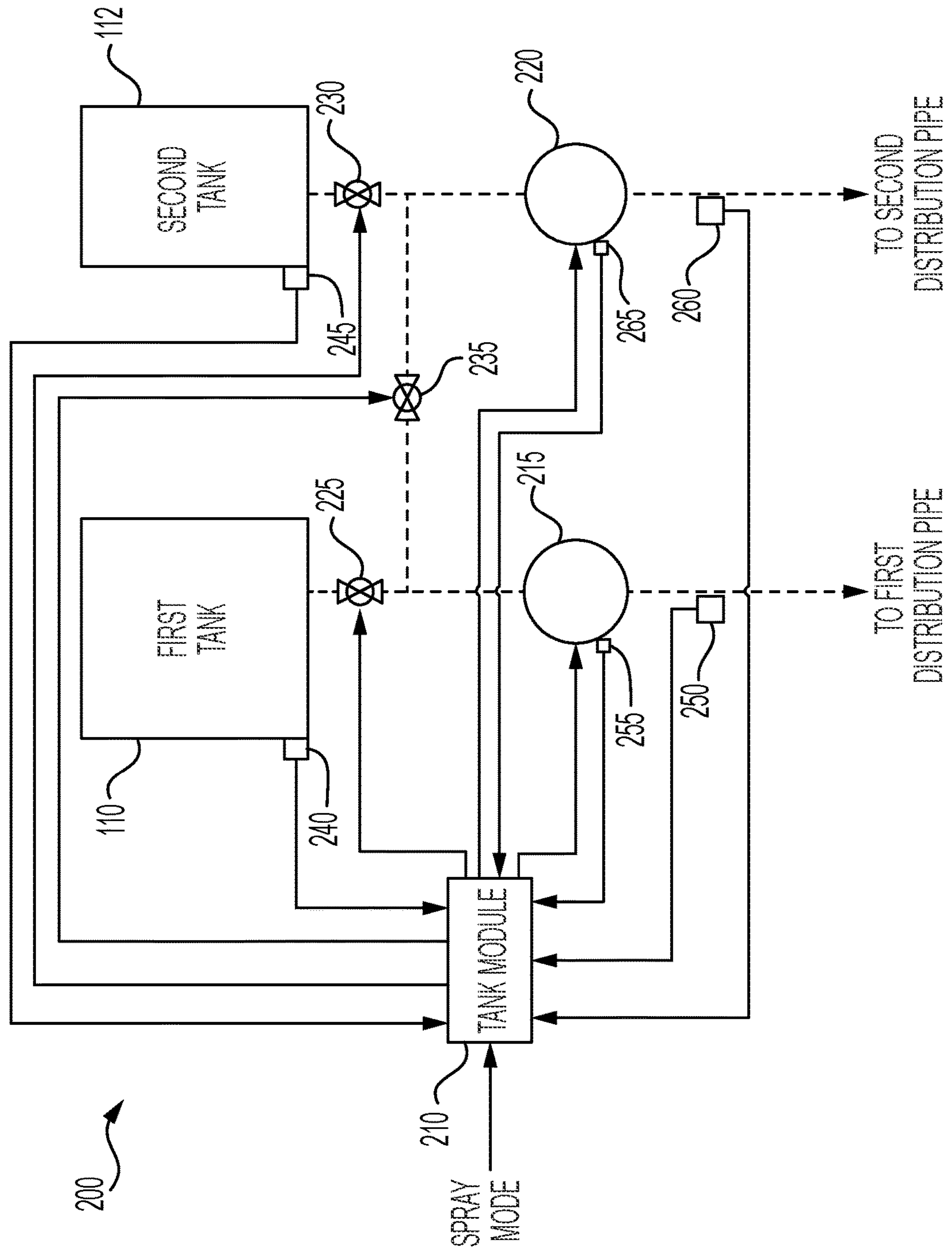
FIG. 2 is a functional block diagram of an example implementation of a multi-tank system according to the principles of the present disclosure.

FIG. 2 is a functional block diagram of an example implementation of a multi-tank system 200. As shown in FIG. 2, the multi-tank system 200 includes the first tank 110, the second tank 112, a tank module 210, a first pump 215, and a second pump 220. Although the first tank 110 and the second tank 112 are shown as two separate tanks in FIG. 2, the first tank 110 and the second tank 112 may be different compartments of a single tank. A first level sensor 240 measures the level of the contents of the first tank 110. Similarly, a second level sensor 245 measures the level of the contents of the second tank 112.

The multi-tank system 200 also includes a first sump valve 225, a second sump valve 230, and an equalizing valve 235. A first end of the first sump valve 225 is in fluid communication with the first tank 110. A second end of the first sump valve 225 is in fluid communication with an inlet of the first pump 215 and a first end of the equalizing value 235. A first end of the second sump valve 230 is in fluid communication with the second tank 112. A second end of the second sump valve 230 is in fluid communication with an inlet of the second pump 220 and a second end of the equalizing value 235.

An outlet of the first pump 215 is in fluid communication with the first distribution pipe and provides a flow of fluid to the spray nozzles 116 mounted along the first distribution pipe. A first pressure sensor 250 measures a fluid pressure associated with the output of the first pump 215. A first speed sensor 255 measures the speed of the first pump 215. An outlet of the second pump 220 is in fluid communication with the second distribution pipe and provides a flow of fluid to the spray nozzles 116 mounted along the second distribution pipe. A second pressure sensor 260 measures a fluid pressure associated with the output of the second pump 220. A second speed sensor 265 measures the speed of the second pump 220. The first pressure sensor 250 and the second pressure sensor 260 may be pressure transducers or other sensors capable of measuring the pressure of the fluid outputted by the first pump 215 or the second pump 220, respectively.

The tank module 210 receives a spray mode that indicates how the first tank 110 and the second tank 112 should be used to supply liquid to the plurality of distribution pipes. For example, the received spray mode can indicate that fluid from both the first tank 110 and the second tank 112 should be supplied to the plurality of distribution pipes, i.e., the first spray pipe and the second spray pipe. Such a spray mode may be received when the same or similar liquid is loaded into the first tank 110 and the second tank 112. In other words, the first tank 110 and the second 112 are used to carry the same substance to be applied to the agricultural field.

The tank module 210 actuates the first sump valve 225, the second sump valve 230, and the equalizing valve 235 based on the received spray mode, and the measured tank levels from the first level sensor 240 and the second level sensor 245. The tank module 210 controls the speed of the first pump 215 and the second pump 220 based on (i) the measured fluid pressures from the first pressure sensor 250 and the second pressures sensor 260 and (ii) the measured pump speeds from the first speed sensor 255 and the second speed sensor 265. For example, the tank module 210 can independently start, vary the speed of, or stop the first pump 215 and the second pump 220.

Although shown in FIG. 2 as only including two tanks and two pumps, in some implementations, the multi-tank system 200 includes three or more tanks and/or three or more pumps. The additional tanks and pumps may be connected in a similar fashion as are the tanks and pump shown in FIG. 2. In such implementations, the system includes an additional sump valve and an additional equalizing valve for each additional tank.

With these additional tanks, the delivery system of chemicals, solutions, products, etc. becomes more complex, particularly as multiple spray modes are available. Moreover, in a multi-tank delivery system, an operator or user may choose between an individual or combined product delivery. For example, in one implementation, a single product may be dispensed from each tank in the system. Here, each tank is filled with the same product for delivery. In another implementation, each tank may be filled with a different product. With the additional functionality of a multi-tank delivery system, the plumbing systems also can become more complex. With this complexity, there can be areas or locations in the plumbing systems in which fluid flow is reduced or there is no flow. As the product is suspended within a fluid line in the plumbing system, there can be some degree of product settlement in the line. In some instances, the product or material in the product that settles can do so in areas where it is able to plug or clog the line. Moreover, the product settlement can also stick to or plug a valve. Here, the material may harden and clog valves or entire sections of the plumbing system. As this happens, fluid flow can be impacted and the overall functionality of the delivery system can be impacted due to low fluid flow and/or clogged valves. Thus, in this disclosure, one or more solutions are proposed for reducing the settlement of product in the plumbing system or fluid lines of the multi-tank delivery system.

In some implementations, an agitation system can be used to address product settlement. This is particularly the case with settlement that can occur in one or more of the tanks of the system. The agitation system can take pressurized fluid from a pump and direct the fluid back into the tank to agitate, or mix, the product that is in the tank. This agitation of product in the tank can reduce or eliminate product settlement in the tank.

Figure 15:
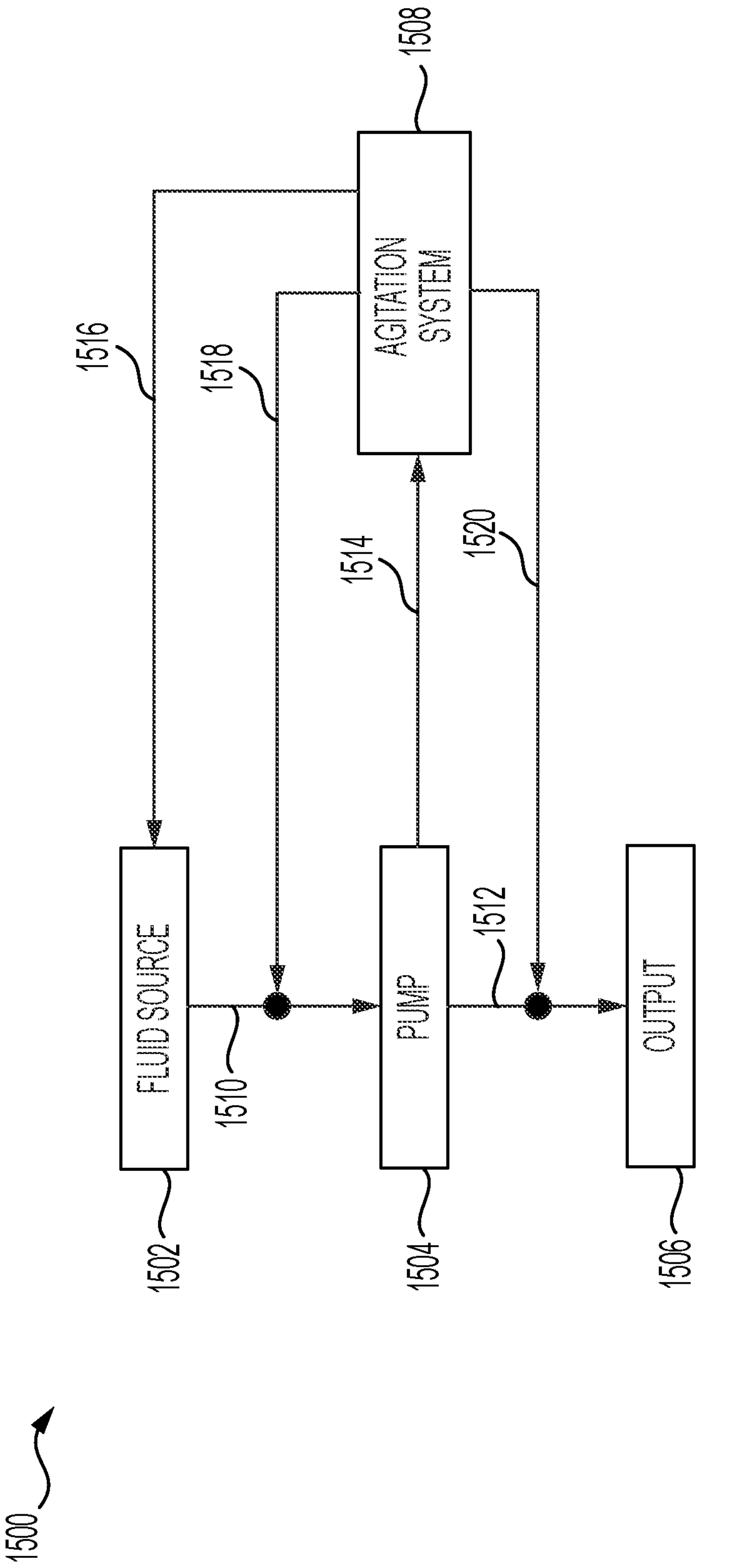
FIG. 15 is a functional block diagram of a fluid delivery system.

Referring to FIG. 15 of the present disclosure, a simplified functional block diagram is shown of one implementation of a fluid delivery system according to the teachings and principles in the present disclosure. In this implementation, a fluid delivery system 1500 for a work machine such as an agricultural sprayer is shown. The fluid delivery system 1500 may include a fluid source 1502. The fluid source 1502 may include a single tank or multiple tanks. The fluid source 1502 is capable of storing one or more products. The one or more products may include a spray chemical, a spray solution, a fertilizer, a pesticide, a weed control, or any other type of product capable of being dispensed from a work machine or implement. A pump 1504 may be fluidly coupled to the fluid source 1502. The pump 1502 may comprise a single pump or multiple pumps. The pump 1504 may receive product from the fluid source 1502 via a first line 1510.

The delivery system 1500 may include an output 1506 which is fluidly coupled to the pump 1504. The output 1506 may be one or more nozzles on a spray boom, for example. The output 1506 may be fluidly coupled to the pump 1504 via a second line 1512. In some implementations, the first line 1510 and second line 1512 may be the same line, whereas in other implementations the two lines may be independent lines.

The delivery system 1500 may also include an agitation system 1508 as shown in FIG. 15. The agitation system 1508 may be fluidly coupled to the pump 1504 via a third line 1514. In one implementation, the agitation system 1508 may include a control valve which controls the flow of pressurized fluid from the pump 1504. As shown, a source agitation line 1516 is fluidly coupled between the agitation system 1508 and fluid source 1502. When the agitation system 1508 is open or enabled, pressurized fluid from the pump 1504 may be directed through the source agitation line 1516 and into the fluid source 1502 to agitate or mix the product therein to avoid product settlement.

In this disclosure, it is desirable to direct pressurized fluid to areas or locations in the different lines of the product delivery system where product tends to settle. These areas or locations may be referred to as a "dead spot." In these areas or locations, there may be little to no fluid flow in the line such that material from the product can settle in the line. In some implementations, a "dead spot" may refer to an area or location in a fluid path or line where a flow velocity of fluid therein is less than necessary to carry the fluid to its intended destination. In another implementation, a "dead spot" may refer to an area or location in a fluid path or line where a pressure drop across the "dead spot" exceeds a threshold.

To avoid product settlement in these areas or locations (i.e., "dead spots"), the product delivery system 1500 can utilize pressurized fluid from the pump 1504 to flush out or agitate the product in these areas or locations. In FIG. 15, for example, a first "dead spot" referenced as location A is shown. Location A may be an area or location in the first line 1510 where product can settle. To address product settlement at location A, a fourth line 1518 may be fluidly coupled from the agitation system 1508 to location A in the first line 1510. In some implementations, this fluid coupling may be an indirect fluid coupling. In other instances, the fourth line 1518 may be directly fluidly coupled to location A. In any event, pressurized fluid may be directed from the pump 1504 to location A to agitate or flush the fluid and thus avoid or reduce product settlement.

Similarly, a second "dead spot" is referenced as location B in the second line 1512 of the product delivery system 1500 of FIG. 15. Location B may be an area or location in the second line 1512 where product can settle. To address product settlement at location B, a fifth line 1520 may be fluidly coupled from the agitation system 1508 to location B in the second line 1512. In some instances, the fifth line 1520 may be directly fluidly coupled to location B. In any event, pressurized fluid may be directed from the pump 1504 to location B to agitate or flush the fluid and thus avoid or reduce product settlement.

While the product delivery system 1500 of FIG. 15 includes an agitation system 1508, it is to be understood in other implementations that an additional line may be fluidly coupled from an outlet of the pump 1504 to a "dead spot" in the system 1500 without directing the fluid through an agitation system. In some implementations, a control valve (not shown) may be fluidly coupled between the pump 1504 and the "dead spot" in the system 1500 to control the flow of pressurized fluid to the "dead spot." Thus, pressurized fluid from the pump may be directed to any area or location where product can settle so as to agitate or mix the product at that area or location (i.e., "dead spot").

Figure 16:
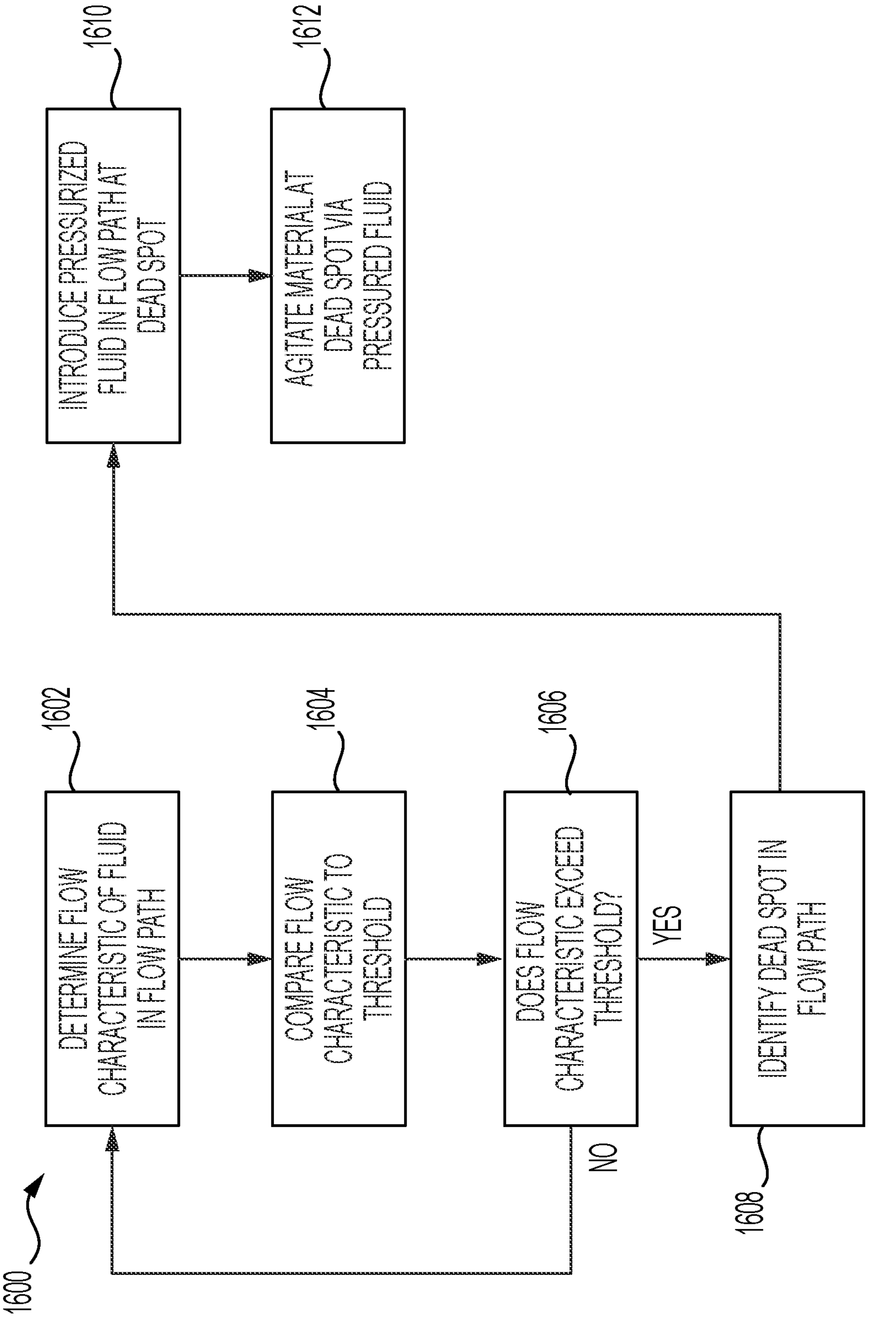
FIG. 16 is a flow diagram of an example implementation for controlling a flow of fluid in a fluid path to reduce or eliminate a dead spot in the path.

Referring to FIG. 16, one implementation of a method for locating a "dead spot" in a fluid line and agitating the settled product there with pressurized fluid is disclosed. In this implementation, a control method 1600 is disclosed which may include one or more blocks or steps which may be executed by a control system. In one example, the control system may include one or more controllers on a work machine such as an agricultural sprayer. In another example, the control system may include one or more sensors in communication with a controller. In a further example, the control system may include one or more flow sensors capable of detecting a flow velocity of fluid flowing through the fluid line. In yet another example, the control system may include one or more pressure sensors or transducers capable of detecting a pressure of fluid flowing through the fluid line. In yet a further example, the control system may include two or more pressure sensors or transducers capable of detecting a pressure drop across a fluid line. In other examples, one or more sensors may be capable of detecting a flow characteristic of a fluid flowing through the fluid line.

In FIG. 16, the method 1600 may begin or start with a first block or step 1602 in which a flow characteristic of fluid may be determined in the fluid path. The flow characteristic may include a flow velocity, a fluid pressure, a pressure drop, a fluid temperature, fluid viscosity and/or any other characteristic. The flow characteristic may be detected by one or more sensors in a control system. Each sensor may be in communication with one or more controllers. In some implementations, simulation or other techniques may be used for identifying a fluid characteristic or a "dead spot" in a fluid line.

Upon receiving the flow characteristic in block 1602, the one or more controllers may compare the flow characteristic to a threshold in block or step 1604. The one or more controllers may include a memory unit and processor unit. The memory unit may be capable of storing algorithms, processes, programs, software, look up tables, data, charts, diagrams, etc. In one instance, one of the controllers may be capable of storing the threshold which is used in block or step 1604. In any event, the flow characteristic which is determined in block 1602 may then be compared to the threshold in block 1604. In some implementations, the detection of the flow characteristic and subsequent comparison to the threshold can be continuously executed.

In block or step 1606, a determination is made as to whether the flow characteristic determined in 1602 exceeds the threshold. The outcome of 1604 is evaluated in block 1606. Based on the comparison in block 1604, if the flow characteristic exceeds the threshold in block 1604, then the method 1600 may advance from block 1606 to block or step 1608 where a dead spot is identified within the fluid line. If the flow characteristic does not exceed the threshold in block 1606, then the method 1600 returns to block or step 1602. In one implementation, a "dead spot" may be identified at a location in a fluid line where the flow velocity of the fluid flowing therein is less than what is required to carry or move the fluid to its destination. In another implementation, a "dead spot" may be defined where the fluid pressure at a location in the fluid line is less than a desired or required pressure. In yet another implementation, a "dead spot" may be defined where a pressure drop from one location in the fluid line to another location exceeds a threshold pressure drop.

Once a dead spot is located or identified in the fluid line in accordance with block or step 1608, the method 1600 may advance to block 1610 to reduce or eliminate the dead spot. To do so, a second fluid line may be fluidly coupled to the original fluid line at or adjacent to the location where the dead spot is identified. A fitting or the like may be coupled between the original fluid line and the second fluid line to complete the fluid coupling. The second fluid line may be fluidly coupled to a source of pressurized fluid. In one example, the source of pressurized fluid may include a pump. The pump may be fluidly coupled to a fluid reservoir, for example, and pump pressurized fluid through the second fluid line to the fluid coupling. In block 1610, the pressurized fluid may be introduced at the fluid coupling to the original fluid line at or adjacent to the dead spot.

In block or step 1612, the introduction of pressurized fluid to the original fluid at or adjacent to the dead spot is designed to agitate or mix the material which has or may settle at the dead spot. The pressurized fluid may be injected or otherwise directed into the original fluid line at or near the dead spot at a 90 degree angle or less relative to the dead spot. In other words, in some implementations, the pressurized fluid may be injected into the original fluid line at an angle so as to agitate or mix the fluid in the original line at or around the dead spot.

Referring to FIGS. 3-9 and 13-14, an implementation of a multi-tank product delivery system 300 is shown. In the system 300 of FIG. 3, for example, a first product system 302 and a second product system 304 are shown. The first product system 302 may include a first tank 306 capable of storing a first product and the second product system 304 may include a second tank 308 capable of storing a second product. In one example, the first product may be different from the second product. In another example, the first product and second product may be the same. In a further example, the first product may be a weed control chemical and the second product may be a fertilizer. In yet another example, the first product may be for a spot spray function in a field and the second product may be for broadcast spray function.

In one example, the first tank 306 may be the same size as the second tank 308. In another example, the first tank 306 may be smaller than the second tank 308. In a further example, the first tank 306 may be larger than the second tank 308. While only two tanks are shown in the system 300, in other implementations there may be three or more tanks forming the multi-tank product delivery system.

Figure 3:
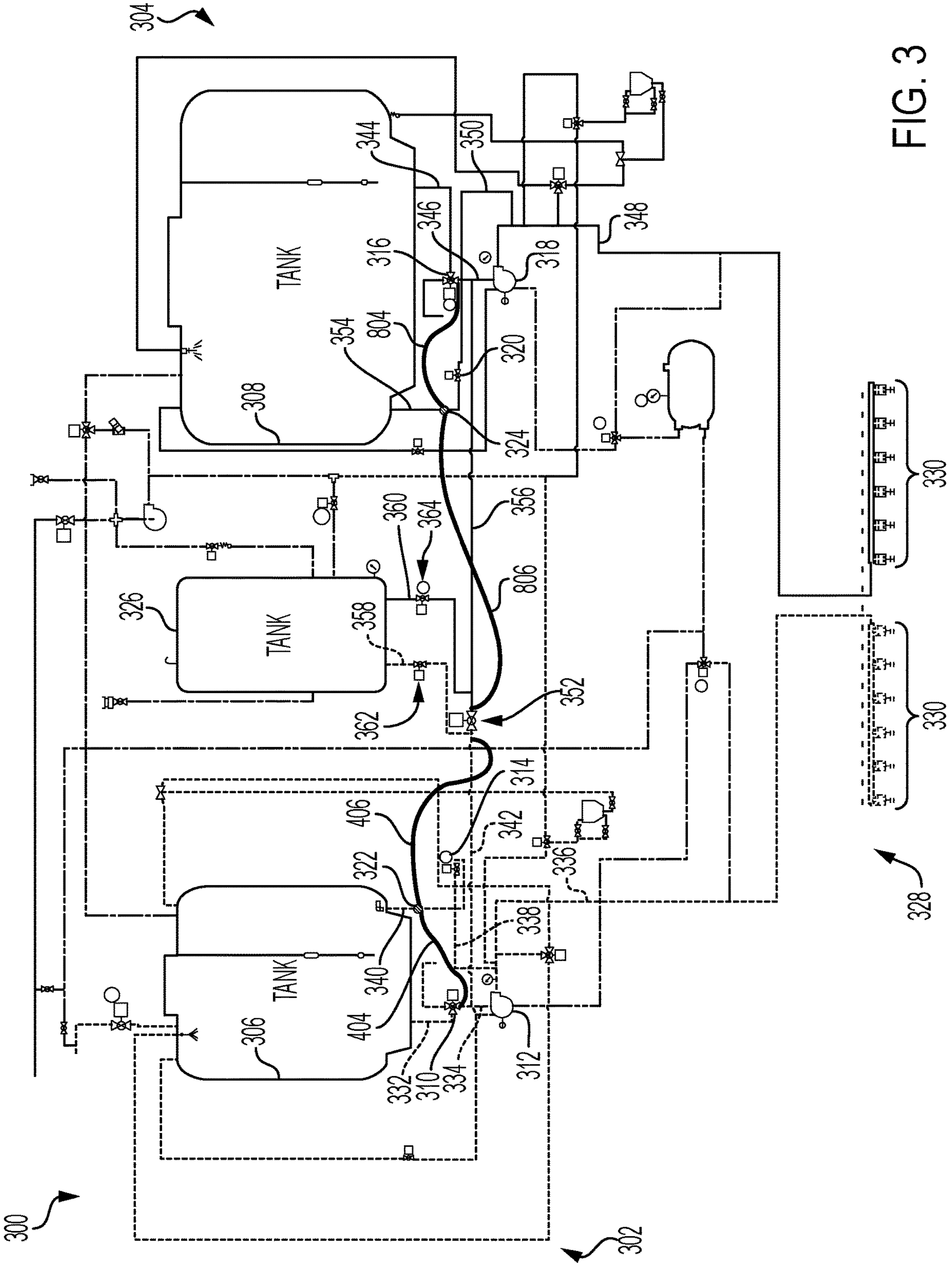
FIG. 3 is a schematic diagram of an example implementation of a multi-tank delivery system according to the principles of the present disclosure.

The system 300 of FIG. 3 may include a third tank referred to as a rinse tank 326. In this implementation, the rinse tank 326 may store a fluid or solution which may be used for fluidly rinsing the system of any product or other substance in the system. In one implementation, the rinse tank 326 may include a first rinse line 358 which is fluidly coupled to the first system 302 and a second rinse line 360 which is fluidly coupled to the second system 304. A first rinse valve 362 may be controlled between an open and closed position to either fluidly couple or decouple the rinse tank 326 to the first system 302. Similarly, a second rinse valve 364 may be controlled between an open and closed position to either fluidly couple or decouple the rinse tank 326 to the second system 304. In other implementations, the multi-tank product delivery system may not include a rinse tank. In some implementations, another tank may be fluidly coupled to the system to perform a rinsing or cleaning function.

In the implementation of FIG. 3, the first tank 306 and second tank 308 may be fluidly coupled to a spray boom section 328 for performing a spraying operation. The spray boom section 328 may include one or more nozzles 330 capable of dispensing product from either or both of the first and second tanks. In several implementations, a first portion of the one or more nozzles 330 may be fluidly coupled to the first tank 302 and a second portion of the one or more nozzles 330 may be fluidly coupled to the second tank 304. In some implementations, each of the one or more nozzles 330 may be fluidly coupled to the first tank 302. In other implementations, each of the one or more nozzles 330 may be fluidly coupled to the second tank 304. In further implementations, each of the one or more nozzles 330 may be fluidly coupled to both of the tanks. For example, a control valve associated with each of the one or more nozzles 330 may be controllably actuated such that the corresponding nozzle 330 may be fluidly coupled or decoupled from a flow path between the one or both tanks and the nozzle 330.

Referring to FIGS. 3-7, the first system 302 of the multi-tank delivery system 300 may include a first pump 312 fluidly coupled to the first tank 306. The first pump 312 may be operably controlled to direct product from the first tank 306 to a first sump valve 310 via a first line 332. The first sump valve 310 may be controlled via a controller (not shown) of a control system. This can be via electronic control, for example. The first sump valve 310 may be operably controlled between an open position and a closed position. In the open position, the first sump valve 310 may fluidly couple the first tank 306 to the first pump 312 such that product in the first tank 306 can be transported from the first tank 306 through one or more flow paths or lines in the system 300. In the closed position, the first sump valve 310 may fluidly decouple the first tank 306 from the first pump 312.

With the first sump valve 310 open, product from the first tank 306 may flow through the first sump valve 310 via the first line 332 into a second line 334 where the first pump 312 produces a pressurized flow of product into the first system 302. The product may be pumped into a third line 336 by the first pump 312 where it is delivered to the boom section 328. One or more of the nozzles 330 may receive the pressurized flow of product and controllably dispense the product onto a field.

Figure 4:
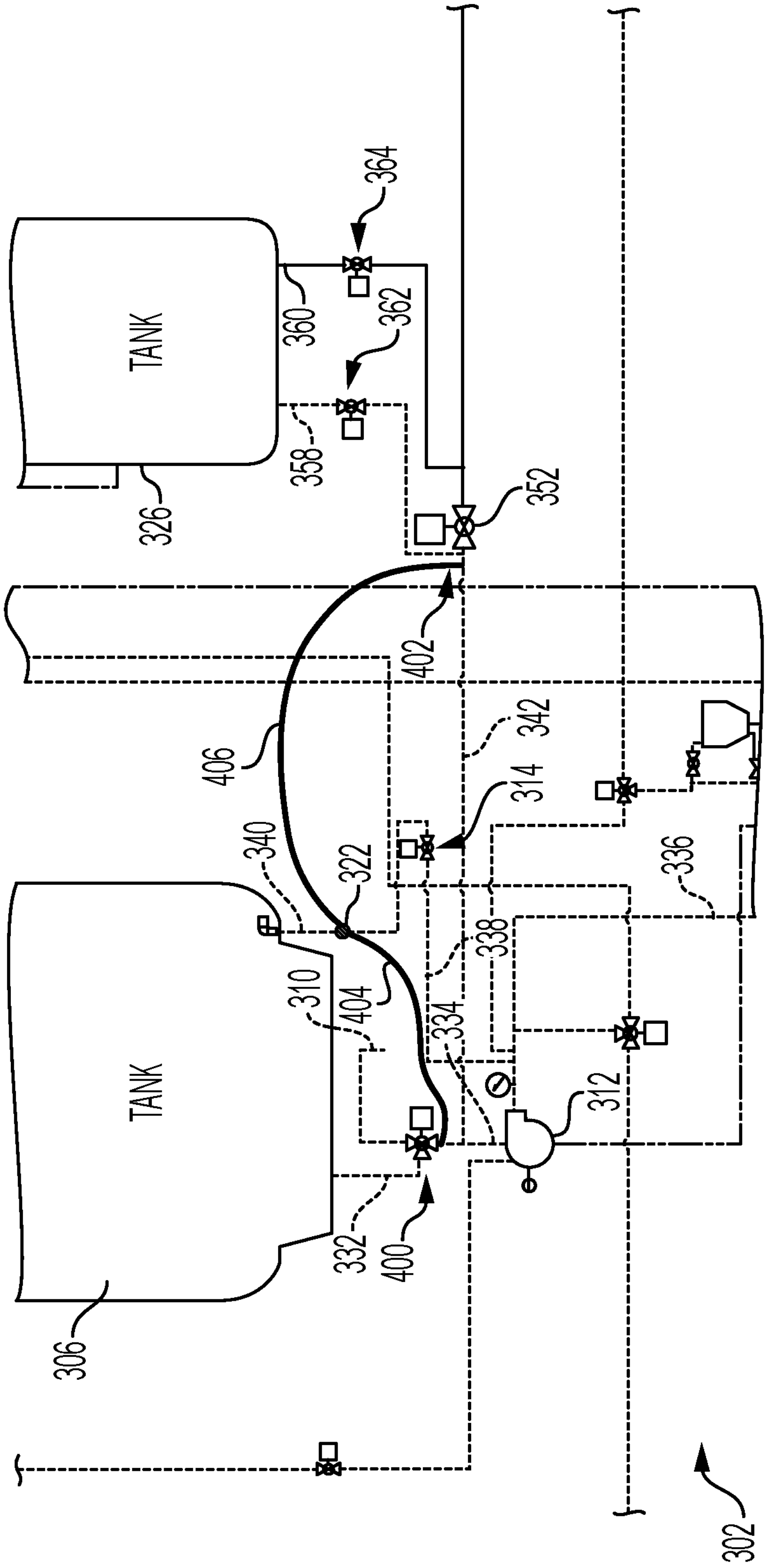
FIG. 4 is a schematic diagram of a first portion of the multi-tank delivery system of FIG. 3.
Figure 5:
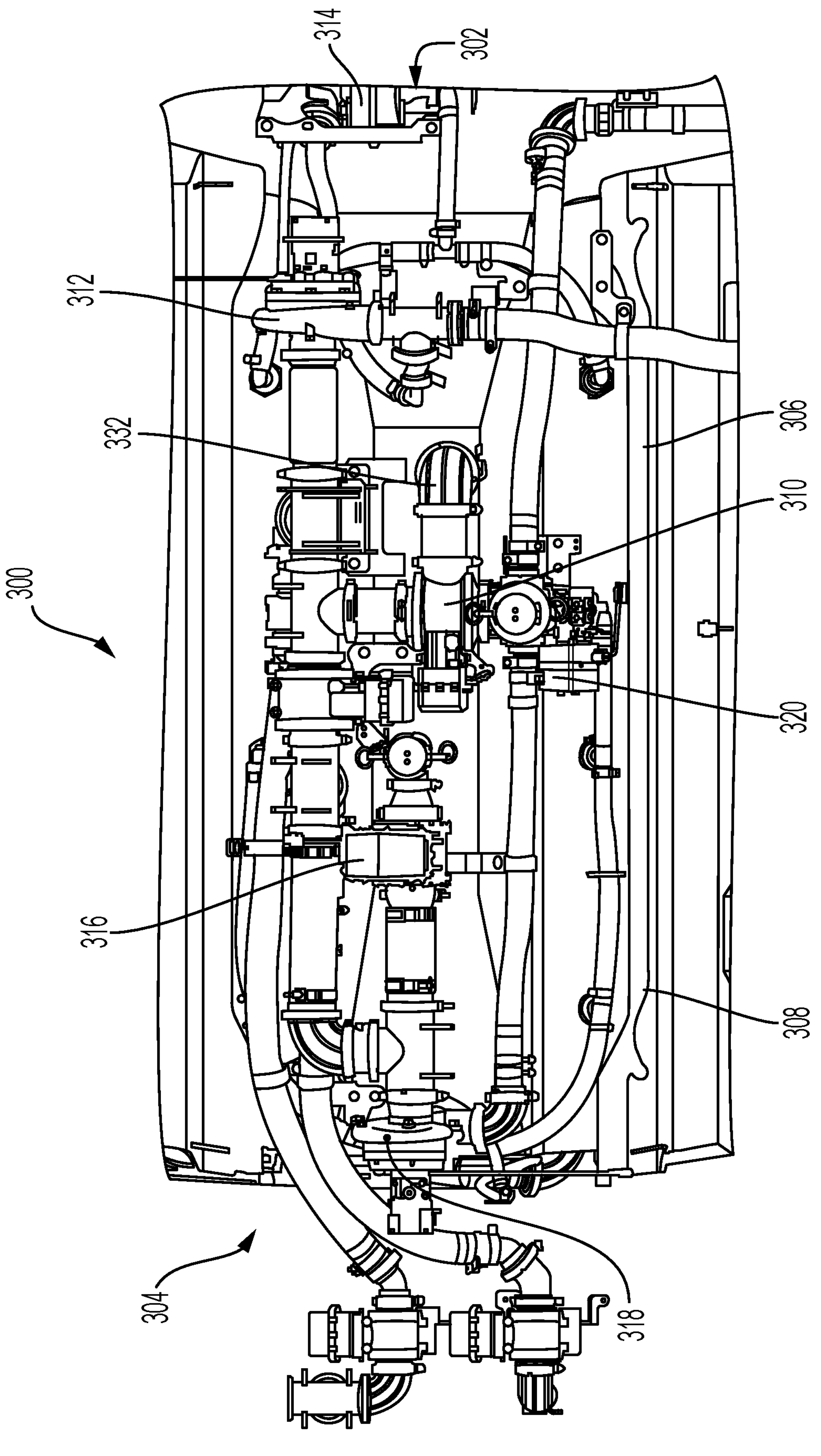
FIG. 5 is a bottom view of an example implementation of a multi-tank assembly for a sprayer system.

The first system 302 may include a first agitation system. The first agitation system may include a first agitation valve 314 as shown in FIGS. 3 and 4. The first agitation valve 314 may be operably controlled between an open position and a closed position. Moreover, the first agitation valve 314 may be fluidly coupled to the first pump 312 via a fourth line 338. In operation, the first agitation system may receive pressurized flow of product from the first pump 312 and direct the pressurized flow to a fifth line 340 which is fluidly coupled to one or more inlets on the first tank 306. When the first agitation valve 314 is open, the fourth line 338 is fluidly coupled to the fifth line 340 to allow pressurized flow from the first pump 312 to return to the first tank 306 to agitate or mix the product in the first tank 306. In some instances, the product in the first tank may settle therein. The pressurized flow therefore returns to the first tank 306 via the first agitation system to agitate or mix any settled product to maintain the appropriate mixture of product in the first tank 306.

The first agitation valve 314 can be operably controlled to a closed position to prevent pressurized flow of product from returning to the first tank 306. A controller may be in communication with the first agitation valve 314 to control it between its open and closed positions. As shown in the implementation of FIGS. 3 and 4, the first agitation valve 314 is located downstream of the first pump 312.

In some implementations, it may be desirable for the product in the first tank 306 and second tank 308 to be separated from one another. This may be the case when the first tank 306 contains a first product and the second tank 308 contains a second product, and the first and second products are different from one another. In other implementations, it may be desirable for the first tank 306 and second tank 308 to contain the same product and thus function as a single delivery system configured to deliver the same product to the boom section 328. In these implementations, a higher flow rate of product may be delivered to the boom section 328, for example.

In any event, an equalizing valve 352 may be fluidly coupled between the first and second systems. The equalizing valve 352 may be located downstream of the first pump 312 as shown in FIGS. 3 and 4. More specifically, the first pump 312 may pump pressurized flow of product to the equalizing valve 352 via a sixth line 342.

Referring to FIGS. 3, 8-9 and 13-14, the second system 304 of the multi-tank delivery system 300 may include a second pump 318 fluidly coupled to the second tank 308. The second pump 318 may be operably controlled to direct product from the second tank 308 to a second sump valve 316 via a seventh line 344. The second sump valve 316 may be controlled via a controller (not shown) of a control system. This can be via electronic control, for example. The second sump valve 316 may be operably controlled between an open position and a closed position. In the open position, the second sump valve 316 may fluidly couple the second tank 308 to the second pump 318 such that product in the second tank 308 can be transported from the second tank 308 through one or more flow paths or lines in the system 300. In the closed position, the second sump valve 316 may fluidly decouple the second tank 308 from the second pump 318.

With the second sump valve 316 open, product from the second tank 308 may flow through the second sump valve 316 via the seventh line 344 into an eighth line 346 where the second pump 318 produces a pressurized flow of product into the second system 304. The product may be pumped into a ninth line 348 by the second pump 318 where it is delivered to the boom section 328. One or more of the nozzles 330 may receive the pressurized flow of product and controllably dispense the product onto a field.

Figure 8:
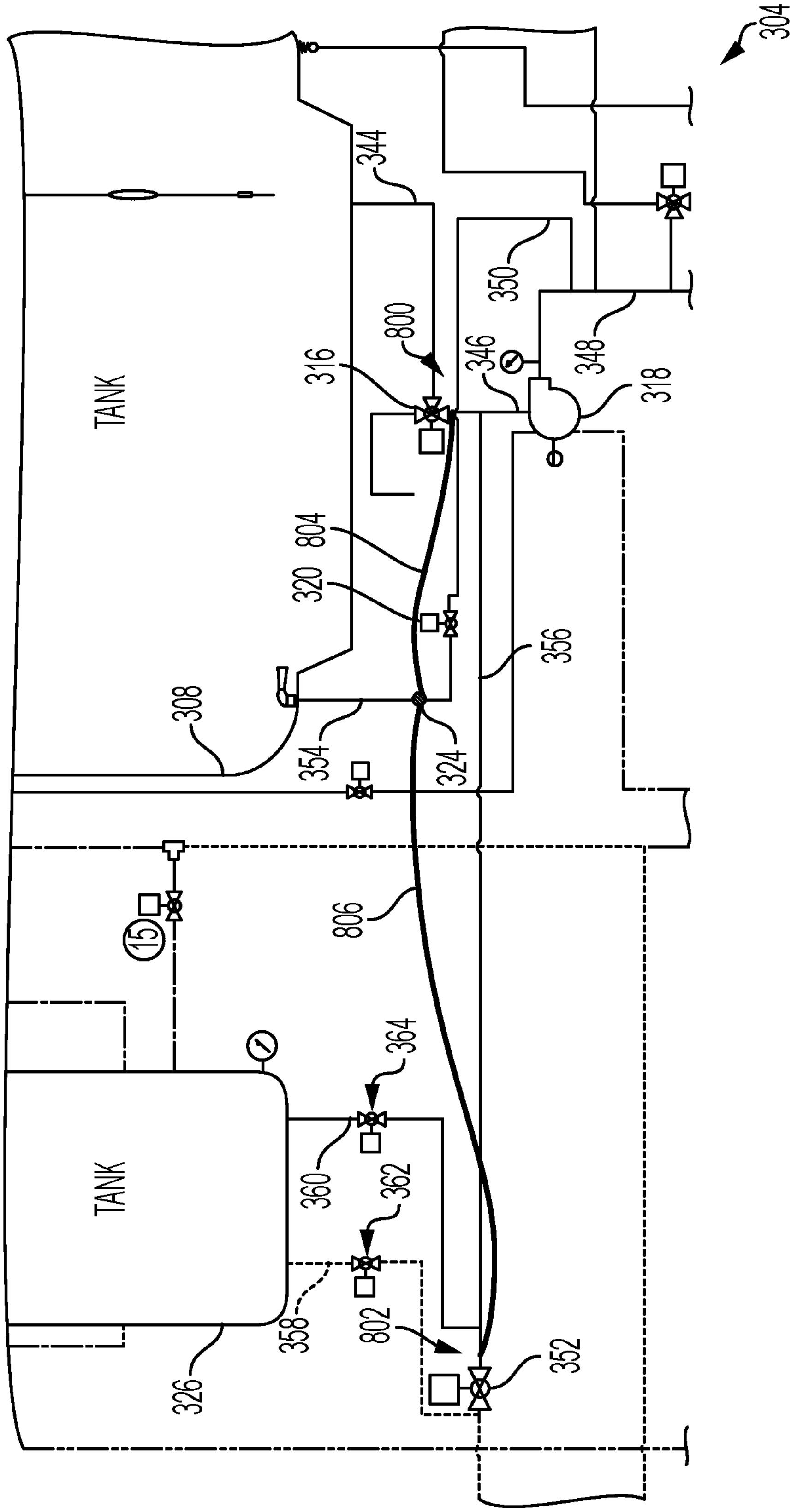
FIG. 8 is a schematic diagram of another portion of the multi-tank delivery system of FIG. 3.

The second system 304 may include a second agitation system. The second agitation system may include a second agitation valve 320 as shown in FIGS. 3 and 8. The second agitation valve 320 may be operably controlled between an open position and a closed position. Moreover, the second agitation valve 320 may be fluidly coupled to the second pump 318 via a tenth line 350. In operation, the second agitation system may receive a pressurized flow of product from the second pump 318 and direct the pressurized flow to an eleventh line 354 which is fluidly coupled to one or more inlets on the second tank 308. When the second agitation valve 320 is open, the tenth line 350 is fluidly coupled to the eleventh line 354 to allow pressurized flow from the second pump 318 to return to the second tank 308 to agitate or mix the product in the second tank 308. In some instances, the product in the second tank may settle therein. The pressurized flow therefore returns to the second tank 308 via the second agitation system to agitate or mix any settled product to maintain the appropriate mixture of product in the second tank 308.

The second agitation valve 320 can be operably controlled to a closed position to prevent pressurized flow of product from returning to the second tank 308. A controller may be in communication with the second agitation valve 320 to control it between its open and closed positions. As shown in the implementation of FIGS. 3 and 8, the second agitation valve 320 is located downstream of the second pump 318.

In some implementations, it may be desirable for the product in the second tank 308 to be in fluid communication with the product in the first tank 306. As described previously, the equalizing valve 352 may be fluidly coupled between the first and second systems. The equalizing valve 352 may be located upstream of the second pump 318 as shown in FIGS. 3 and 8. More specifically, the second sump valve 316 may allow the flow of product to the equalizing valve 352 via a twelfth line 356. In this implementation, the twelfth line 356 may be fluidly coupled to the sixth line 342 when the equalizing valve 352 is open. Thus, the sixth line 342 and twelfth line 356 may form a fluid path between the outlet of the first sump valve 310 and the outlet of the second sump valve 316.

The first and second agitation valves may be operably controlled to their open positions depending on the type of product being dispensed from the first and second tanks. Some products may not require agitation because they do not tend to settle when in suspension within a fluid line. In these instances, the respective agitation valve may remain closed. Glyphosate is one example of a type of product or chemical that does not require agitation. On the other hand, atrazine is an example of a type of product that has a tendency to settle when suspended in a fluid line. Other examples may include fertilizers, surfactants or other products that may not fully dissolve. For instance, a dry granular product may not completely dissolve in its mixed stated and thus may settle.

In the multi-tank delivery system 300 of FIG. 3, there can be one or more locations where a “dead spot” may occur, i.e., where product can settle due to a lack of flow at the location. In FIG. 4, for example, a first “dead spot” 400 may be located at or near the first sump valve 310. In some instances, the orientation or arrangement of the sump valve 310 relative to the first tank 306 and first line 332 can result in the first “dead spot” 400. Some product may settle at this location when the first sump valve 310 is open or closed. Similarly, as shown in FIG. 8, a second “dead spot” 800 may be located at or adjacent to the second sump valve 316.

Another “dead spot” may be located at each side of the equalizing valve 352. In FIG. 4, a third “dead spot” 402 may be located in the sixth line 342 near the equalizing valve 352. The third “dead spot” 402 may be located in the first system 302 as shown. A fourth “dead spot” 802 may be located on the other side of the equalizing valve 352 in the second system 304. Specifically, the fourth “dead spot” 802 may be located in the twelfth line 356 as shown in FIG. 8. The dead spots on either side of the equalizing valve may arise when the equalizing valve 352 is closed and thus there is less flow of product in the sixth line 342 and twelfth line 356.

Figure 6:
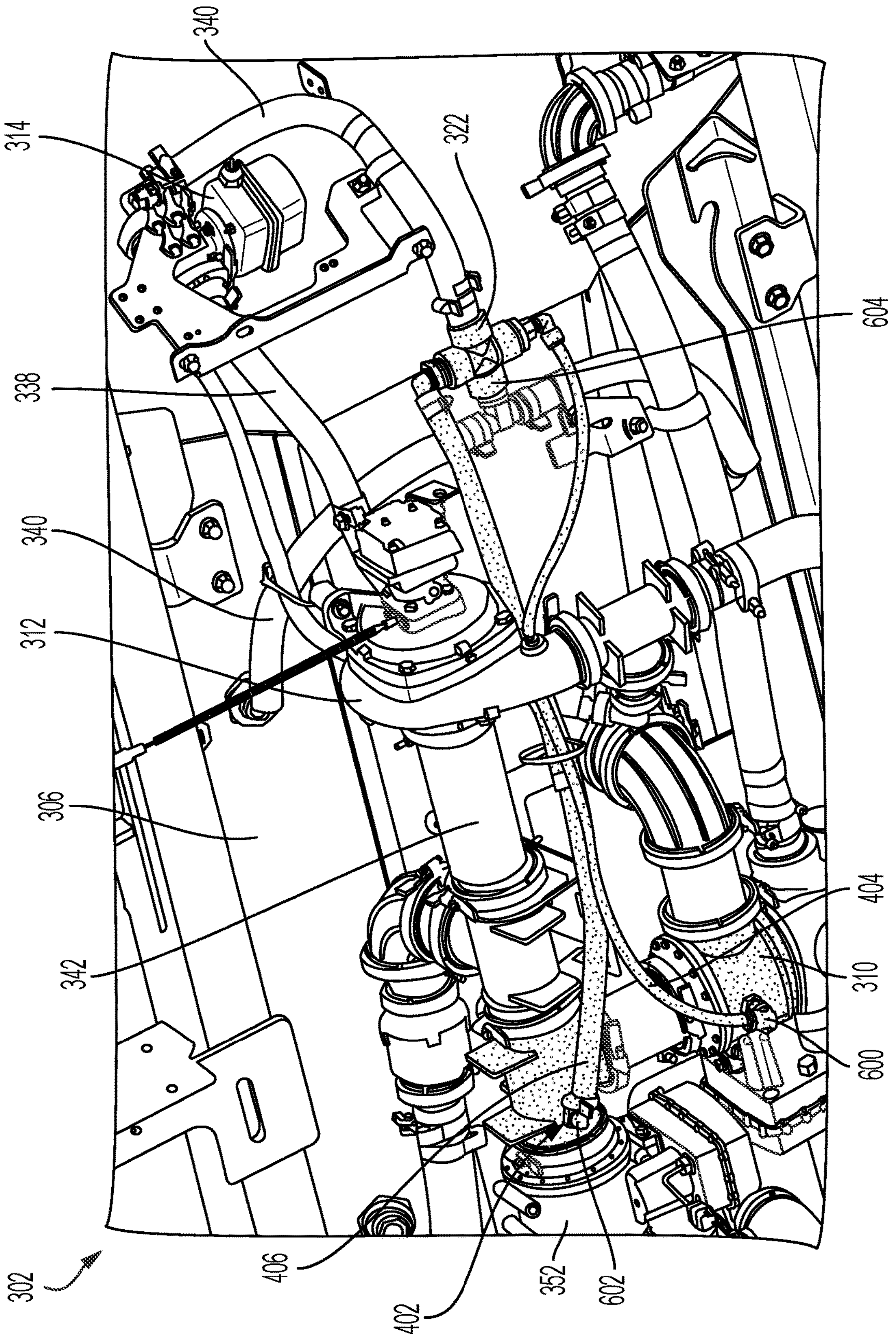
FIG. 6 is a perspective view of a portion of the multi-tank assembly of FIG. 5.
Figure 7:
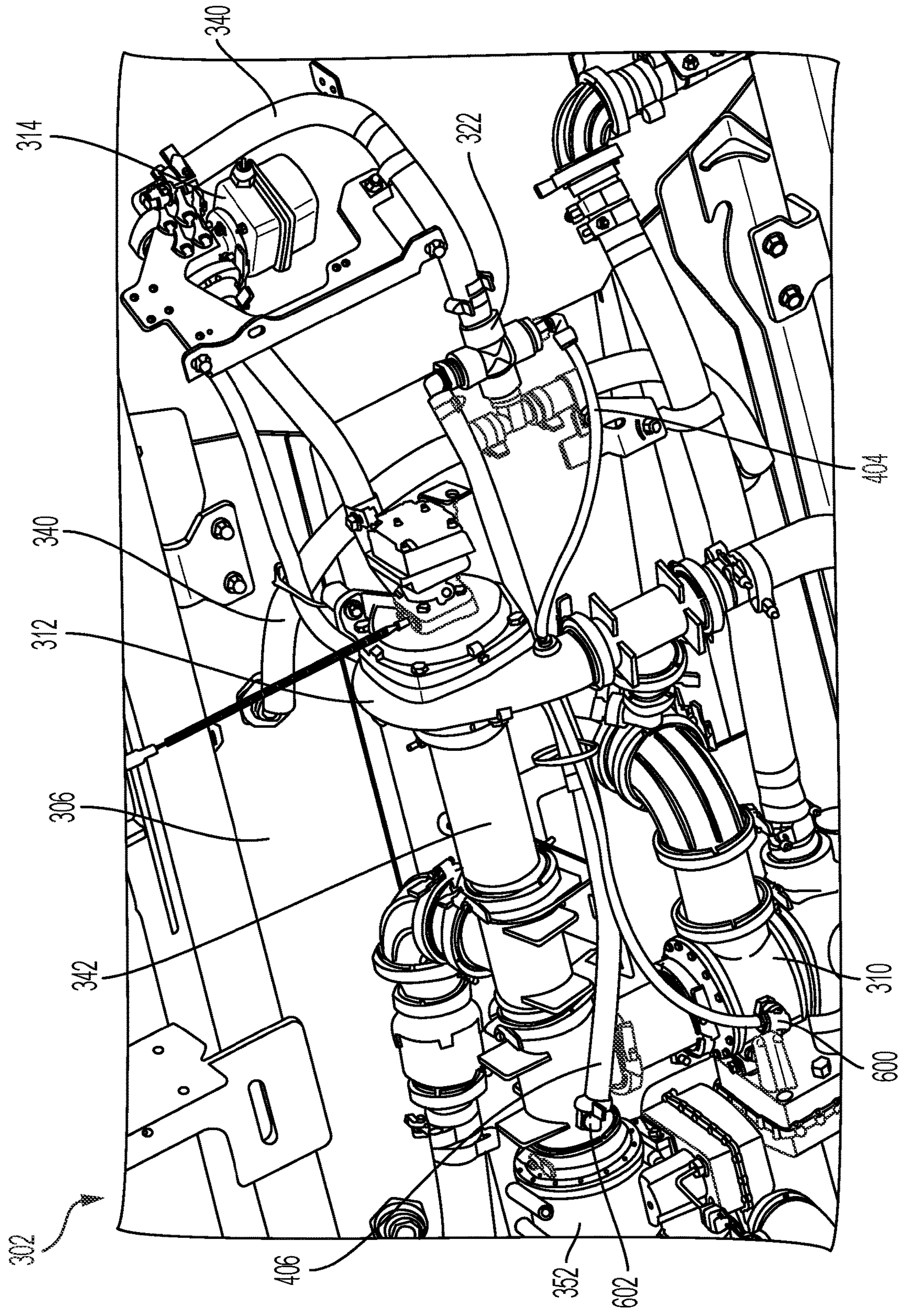
FIG. 7 is another perspective view of the portion of the multi-tank assembly of FIG. 5.

To address "dead spots" in the system 300 or any fluid delivery system, the process set forth above and described relative to FIG. 16 may be executed. In block or step 1608 of the method 1600, pressurized fluid may be introduced in the flow path or line at the "dead spot." In the system 300 of FIG. 3, the first and second agitation lines can be used for introducing pressurized fluid or product into the various lines where the "dead spot" is located. In FIGS. 3 and 4, for example, the first agitation system may include a first breakout portion 322. In FIG. 6, one example of the first breakout portion 322 may include a T-fitting 604. The first breakout portion 322 may be located downstream of the first agitation valve 314 in the implementation of FIG. 3. In another implementation, the first breakout portion 322 may be located between an outlet of the first agitation valve 314 and the first tank 306. In yet another implementation, the first breakout portion 322 may be located anywhere downstream of the first pump 312 such that pressurized fluid or product from the first pump 312 can be used to reduce or eliminate a "dead spot" in the first system 302.

Figure 9:
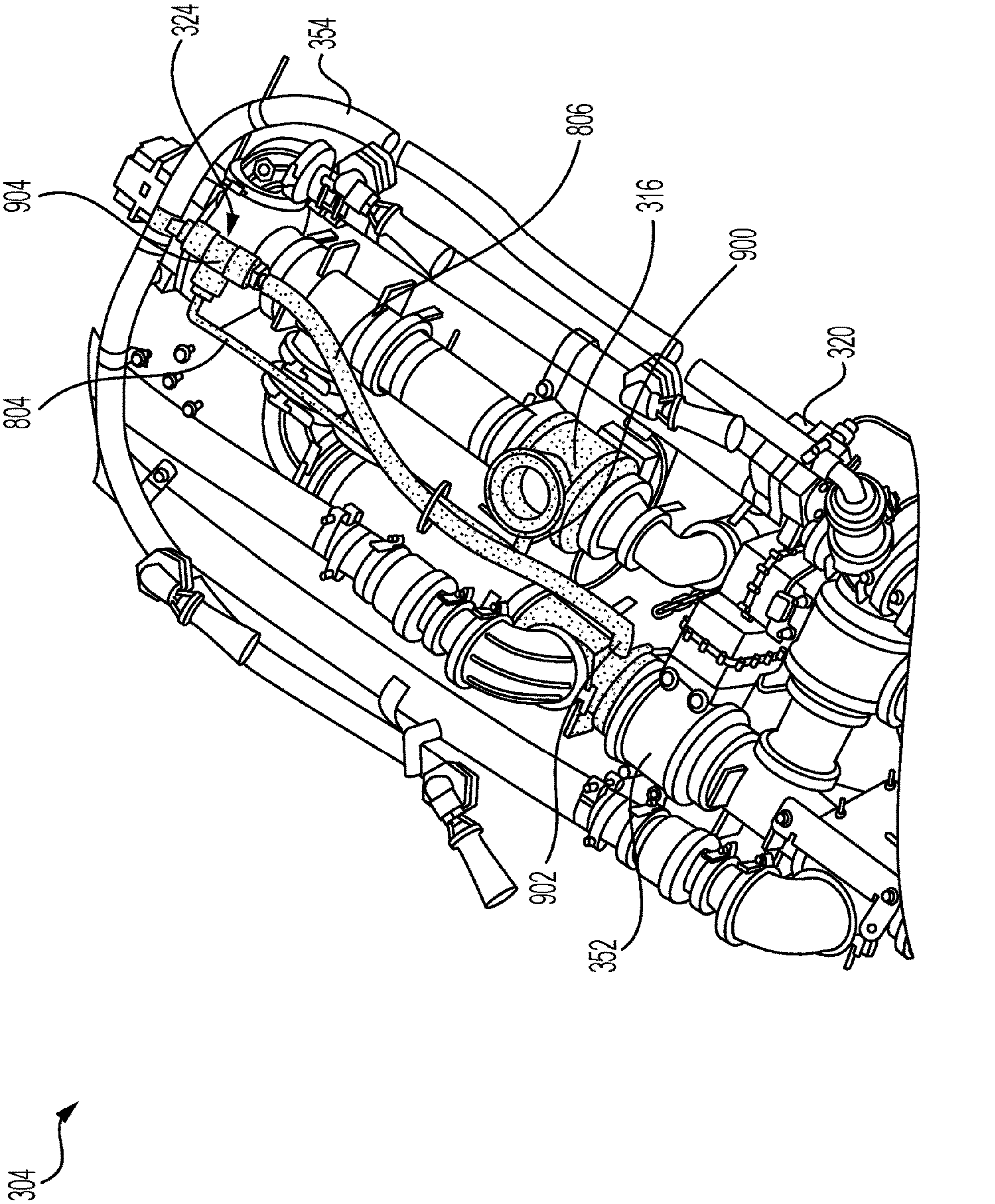
FIG. 9 is a perspective view of a portion of the multi-tank assembly of FIG. 5.

Referring to FIG. 8, the second agitation system may include a second breakout portion 324. In FIG. 9, the second breakout portion 324 may include a T-fitting 904. Other hardware may be used to form the second breakout portion 324. The second breakout portion 324 may be located downstream of the second agitation valve 320 in the implementation of FIG. 8. In another implementation, the second breakout portion 324 may be located between an outlet of the second agitation valve 320 and the second tank 308. In yet another implementation, the second breakout portion 324 may be located anywhere downstream of the second pump 318 such that pressurized fluid or product from the second pump 318 can be used to reduce or eliminate a "dead spot" in the second system 304.

In FIGS. 3 and 4, the first breakout portion 322 may be fluidly coupled to the sixth line 340. Thus, pressurized fluid or product flowing through the sixth line 340 may be received by the first breakout portion 322. At the first breakout portion 322, a first agitation line 404 and a second agitation line 406 may be fluidly coupled thereto. The first agitation line 404 may be fluidly coupled between the first breakout portion 322 and the first sump valve 310. The second agitation line 406 may be fluidly coupled between the first breakout portion 322 and the sixth line 342 adjacent to the equalizing valve 352.

In FIG. 6, a first fluid port 600 is shown coupled to the first sump valve 310 and a second fluid port 602 is coupled to the sixth line 342. In this implementation, pressurized fluid or product flowing through the first agitation system may flow into the first breakout portion 322. As it does, a first portion of the pressurized fluid may flow into the first agitation line 404 and flow therethrough to the first sump valve 310. A second portion of the pressurized fluid or product may flow into the second agitation line 406 and flow therethrough to the sixth line 342.

With respect to the first sump valve 310, the pressurized fluid or product may flow into the first sump valve 310 via the first fluid port 600. As it does, the pressurized fluid or product can agitate or mix the existing product in the valve 310 that may have settled in the first "dead spot" 400. Further, as the product in the valve 310 is agitated and mixed, it may flow through the first sump valve 310 and back into the fluid circuit formed in the first system 302.

Figure 10:
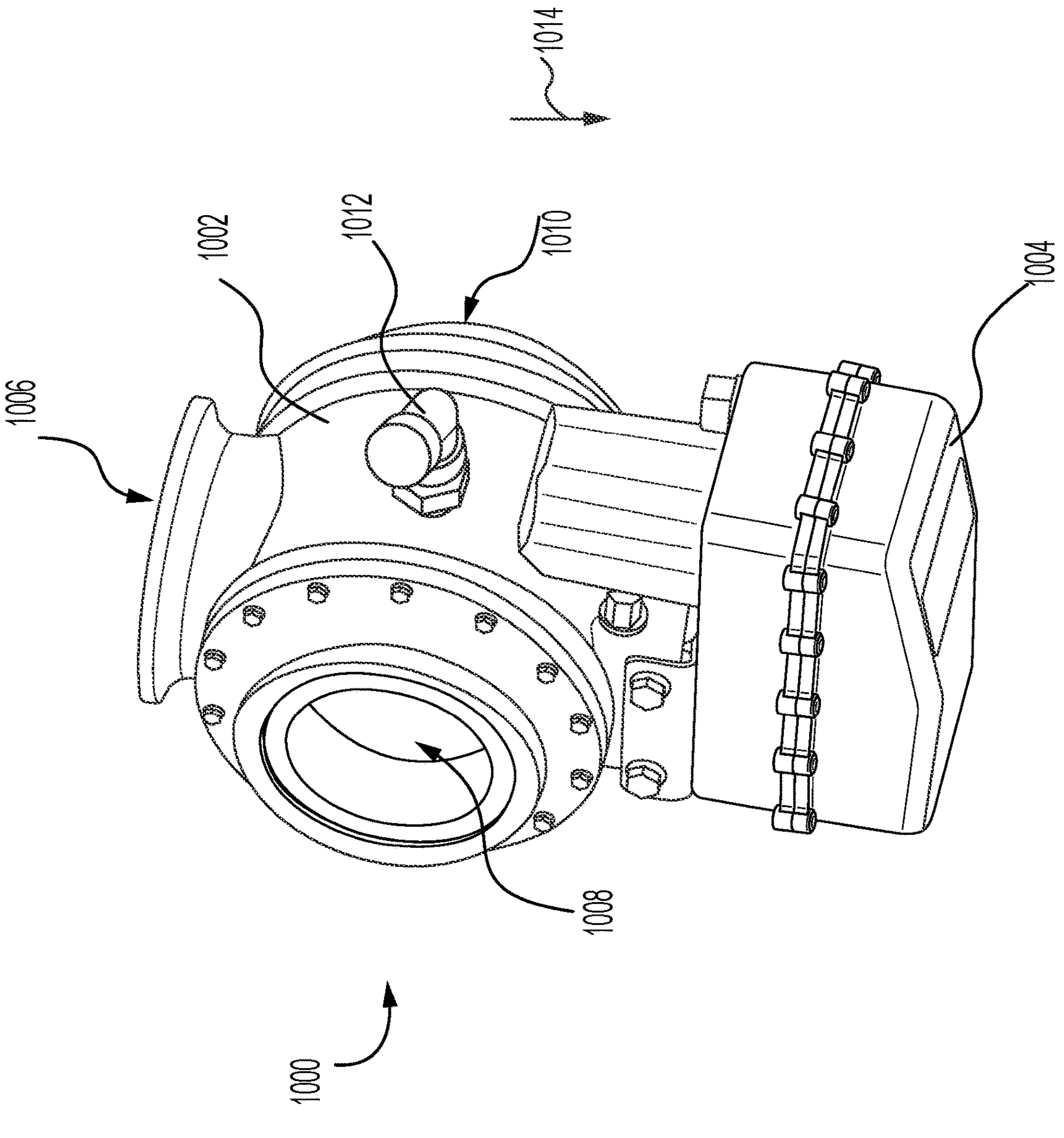
FIG. 10 is a perspective view of a tank sump valve.
Figure 12:
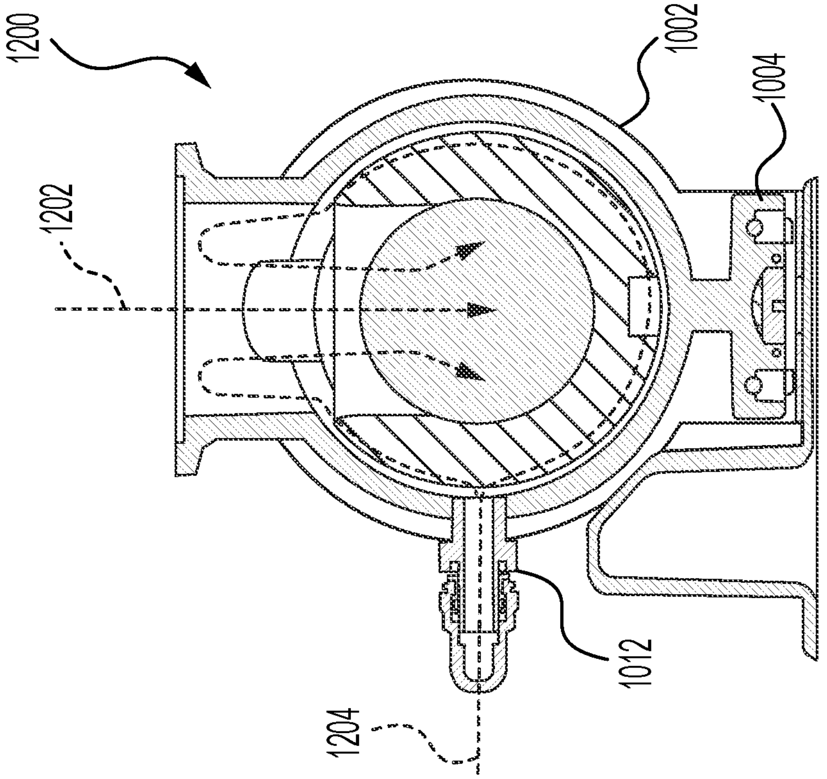
FIG. 12 is a schematic representation of the tank sump valve of FIG. 10 in a second position.

In FIG. 10, one implementation of a sump valve 1000 is shown. The sump valve 1000 may be similar to the first sump valve 310 and second valve 316 of FIG. 3. The sump valve 1000 may include a valve body 1002 and a control portion 1004. The control portion 1004 may include a solenoid and/or actuator for actuating the valve between two or more positions. In one example, the control portion 1004 may be in communication with a controller (not shown) which triggers actuation of the valve between its various positions. In the implementation of FIG. 10, the valve 1000 may include one or more inlets and outlets. In one example, the valve 1000 may include a first inlet 1006, a second inlet 1010, and a first outlet 1008. In another example, the valve 1000 may include a first inlet 1006, a first outlet 1008 and a second outlet 1010. In the arrangement of the valve 1000 in FIG. 10, product from a tank may flow into the valve 1000 in a direction of gravity 1014 via the first inlet 1006. The valve 1000 is capable of receiving product from the tank when it is in its open position 1200 (FIG. 12). In one example, the open position 1200 of the valve 1000 may correspond with a first or spray mode where the valve 1000 is part of an agricultural sprayer. Product may be dispensed into the sump valve 1000 via a first flow path 1202 such that it may exit the valve 1000 via the first and/or second outlets.

As also shown in FIG. 10, the sump valve 1000 may include a fluid fitting 1012 coupled to the valve body 1002. In one implementation, the fluid fitting 1012 may correspond with the first port 600 which is fluidly coupled to the first agitation line 404. Pressurized fluid or product may flow into the valve body 1002 via the fluid fitting 1012 along a second flow path 1204. As shown in FIG. 12, the pressurized fluid or product may flow into the valve body 1002 via the second flow path 1204 and agitate or flush any product which may settle towards a bottom of the valve body 1002.

Figure 11:
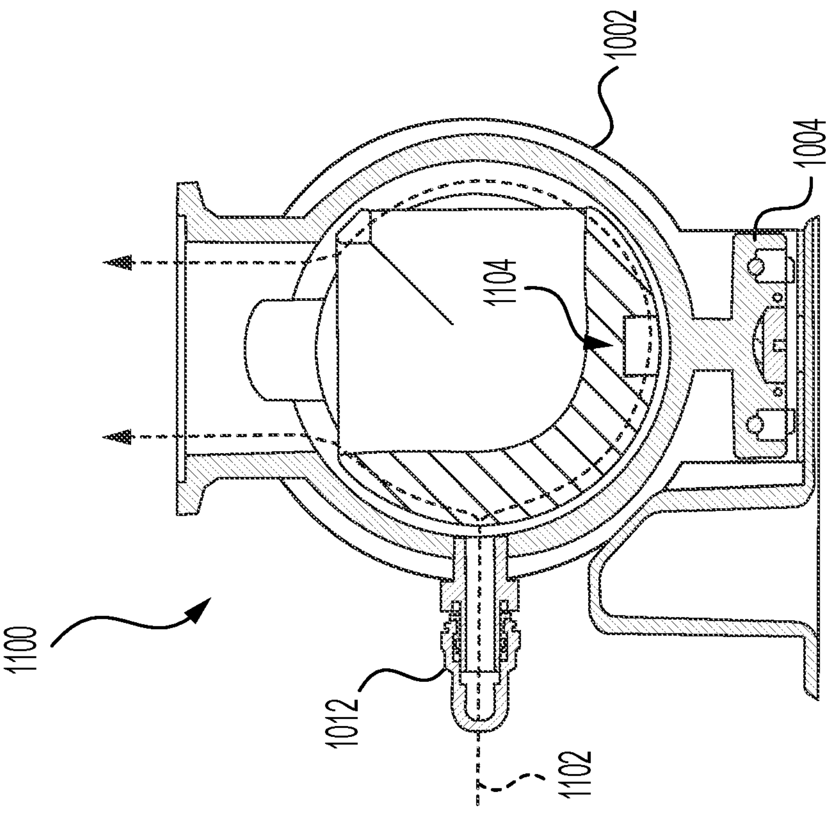
FIG. 11 is a schematic representation of the tank sump valve of FIG. 10 in a first position.

In a second or rinse mode, the sump valve 1000 may be in a closed position 1100 as shown in FIG. 11. In the closed position 1100, the control portion 1004 of the valve 1000 may actuate a ball (not shown) into a position to shut off the first inlet 1006 from receiving fluid or product from the tank. Thus, no fluid or product may enter the system via the sump valve 1000 in the closed position. In other words, the first flow path 1202 of FIG. 12 is closed off. In the closed position 1100, pressurized fluid or product may still flow into the valve body 1002 of the sump valve 1000 via the fluid fitting 1012. In FIG. 11, a fluid flow 1102 of pressurized fluid or product may be pumped into valve body to agitate or mix any product that settles in the valve body 1002 as shown in FIG. 11. The valve body 1002 may form an internal cavity into which product may flow. The internal cavity may define an upper portion where product flows into the cavity via the first inlet 1006. Due to gravity, there can be a "dead spot" towards an opposite end, or a lower portion 1104, of the valve body 1002 as shown. The lower portion 1104 may be defined at or towards the bottom end of the valve body 1002 nearest the control portion 1004. In one implementation, the upper portion may be defined in an upper half of the cavity and the lower half may be defined in a lower half of the cavity. Thus, pressurized fluid or product that is able to flow into the lower portion 1104 between the ball (not shown) and the valve body so as to be able to agitate or flush any settled product in this area. In one implementation, the valve 1000 may be in its closed position 1100 when the system is being rinsed via fluid from the rinse tank 326. In this implementation, the agitation system may be open (i.e., the agitation valve(s) may be open) to allow fluid to flow through the various lines during a rinse mode.

As shown in FIGS. 11-12, the sump valve 1000 can be agitated or flushed when it is either open or closed. In one implementation, the location of the fluid fitting 1012 may be oriented substantially perpendicular to the direction of gravity 1014. In this implementation, fluid flow into the valve body 1002 via the fitting 1012 may be generally perpendicular to the direction of gravity 1014 as shown in FIGS. 11 and 12. In another implementation, the fluid fitting 1012 may be angled relative to the valve body 1002. For example, the fluid fitting 1012 may be angled towards the lower portion 1104 of the valve body 1002 to enable the pressurized fluid to flow directly into the lower portion 1104. In one example, the fitting 1012 may be oriented at an angle of less than 90° relative to the direction of gravity 1014. In another example, the fitting 1012 may be angled at an angle less than 75° relative to the direction of gravity 1014. In a further example, the fitting 1012 may be angled at an angle less than 60° relative to the direction of gravity 1014. In yet another example, the fitting 1012 may be oriented at an angle less than 45° relative to the direction of gravity 1014. In still another example, the fitting 1012 may be oriented at an angle less than 30° relative to the direction of gravity 1014.

In a further implementation, the fitting 1012 may be located in the valve body 1002 as close to the lower portion 1104 as possible. In some implementations, the fitting 1012 may be located at the bottom end of the valve body 1002. In other implementations, the fitting 1012 may be located in a side wall of the valve body 1002 adjacent to the control portion 1004 of the valve. In yet other implementations, the fitting 1012 may be located in the valve body 1002 towards the lower portion 1104 and angled such that pressurized fluid flowing into the valve body 1002 via the fitting 1012 flows towards the lower portion 1104. In still a further implementation, the fitting 1012 may be located between the upper portion and lower portion 1104 of the cavity formed by the valve body 1002.

Referring to FIGS. 3 and 4 of the present disclosure, the first breakout portion 322 may be formed at any location in the agitation system. The agitation system may include the fourth line 338 and the fifth line 340. In the implementation of FIGS. 3 and 4, the first breakout portion 322 is formed in the fifth line 340 downstream from the first agitation valve 314. In other implementations, the first breakout portion 322 may be formed in the fourth line 338 upstream from the first agitation valve 314. In some implementations, a control valve may be located upstream from the first breakout portion 322 to control the flow of pressurized fluid or product to the first agitation breakout 322. The control valve (not shown) or first agitation valve 314 may control the flow of pressurized fluid or product to the first and third agitation lines in the first system 302 when agitation is needed or desired. As noted previously, some products may not require agitation due to their chemical makeup and thus the agitation valves or control valves in the system 300 may be closed.

Figure 13:
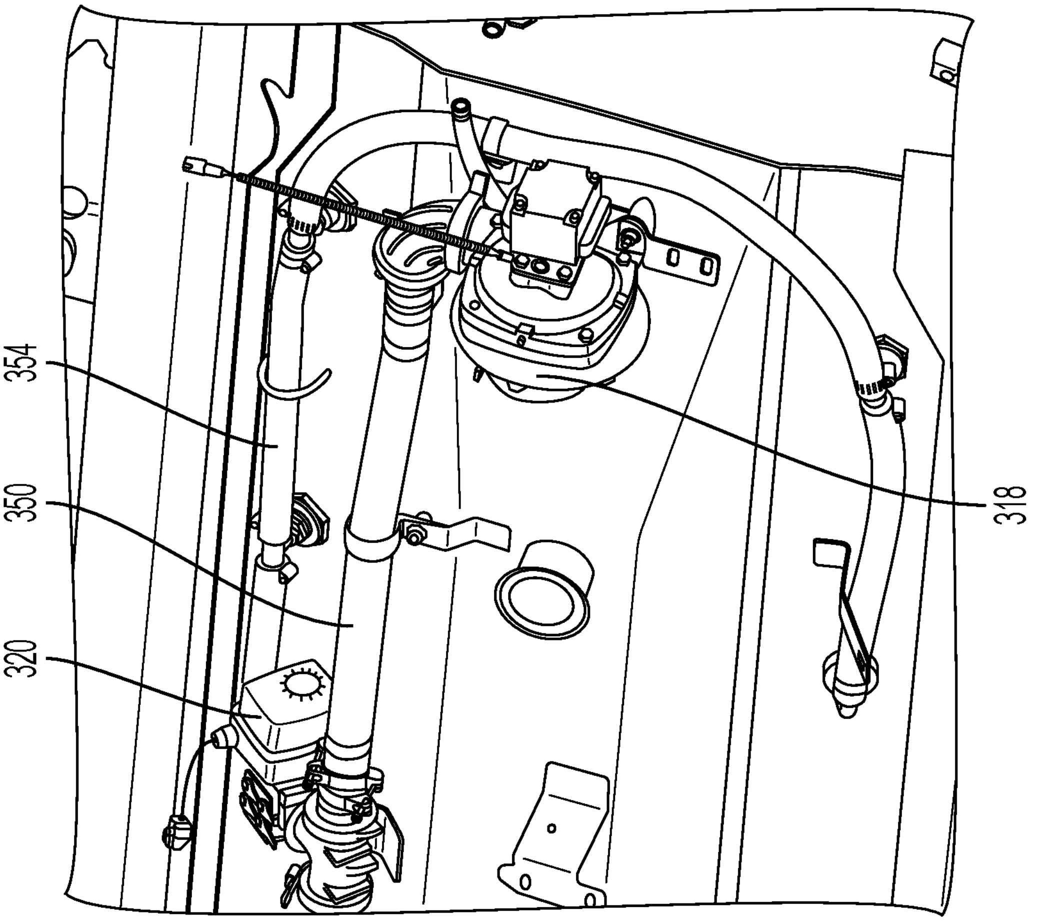
FIG. 13 is a perspective view of a portion of the multi-tank assembly of FIG. 5.
Figure 14:
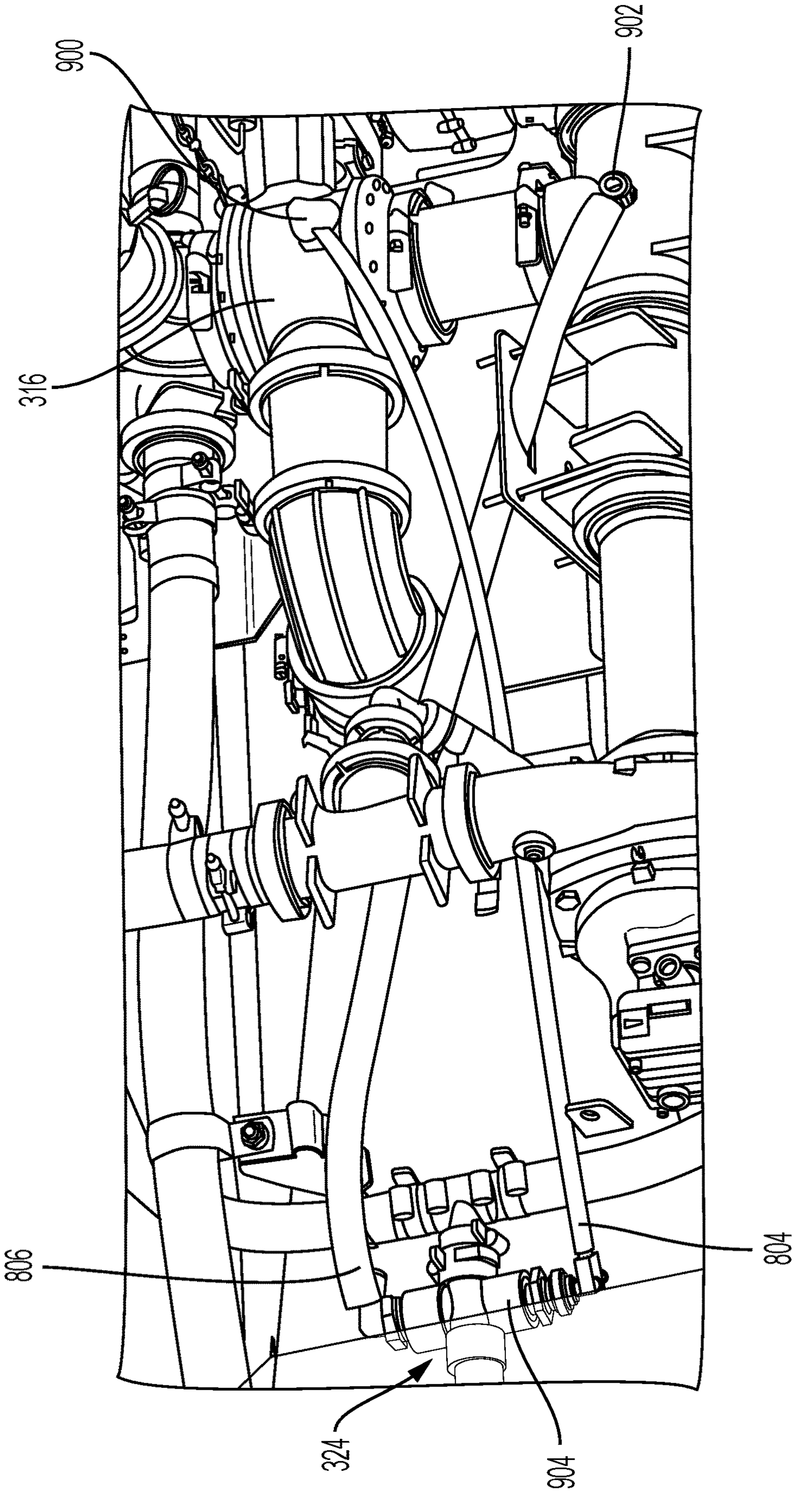
FIG. 14 is another perspective view of a portion of the multi-tank assembly of FIG. 5.

In the second system, the second sump valve 316 may also include a fluid fitting coupled thereto. In FIG. 9, for example, a first fluid port 900 may be formed in the body of the second sump valve 316. Similarly, a second port 902 may be formed in the twelfth line 356 adjacent to the equalizing valve 352. A first agitation line 804 may be fluidly coupled between the second breakout portion 324 and the first port 900 of the second sump valve 316. Moreover, a second agitation line 806 may be fluidly coupled between the second breakout portion 324 and the second port 902 formed in the twelfth line 356. Thus, agitation or flushing of the second "dead spot" 800 in the second sump valve 316 and the fourth "dead spot" 802 in the twelfth line 356 may be possible via these additional agitation lines. The design and function of these additional agitation lines may be similar to those described with respect to the first system 302. Further, some examples of the layout or arrangement of the various agitation lines, valves, etc. in the second system 304 is shown in FIGS. 9, 13 and 14.

With respect to the agitation of the "dead spots" on either side of the equalizing valve 352, in some implementations it can be desirable to position the ports 602, 902 as close to the equalizing valve as possible. In one implementation, the ports 602, 902 may be located at any location 360° around the valve 352. In another implementation, the ports 602, 902 may be angled relative to the equalizing valve 352 such that pressurized flow is directed at or in a general direction towards the equalizing valve 352. In this manner, pressurized flow may be impinged against the valve 352. Thus, as product tends to settle at or near the equalizing valve, pressurized fluid or product may be injected into these "dead spots" to agitate or mix the settled product and return the product into the flow path within either the first or second system.

In one implementation, the pressurized fluid used to agitate or flush the third "dead spot" 402 in the first system 302 may be different from the pressurized fluid used to agitate or flush the fourth "dead spot" 802 in the second system 304. These "dead spots" tend to form when the equalizing valve 352 is in its closed position such that there is generally less flow in and around the equalizing valve 352. When the equalizing valve 352 is open, there is generally more flow through the equalizing valve 352 and thus less tendency for product to settle in or around the equalizing valve 352.

As described throughout this disclosure, the various valves (e.g., sump valves, agitation valves, etc.) may be controlled via one or more controllers. In one implementation, a first controller (not shown) such as a spray rate controller may control one or more of the valves in the second system 304. The first controller may be capable of determining an amount of flow being pumped to the spray section 328 and control which of the one or more nozzles 330 is active. For example, the first controller may use the amount of flow as well as a groundspeed of the work machine or spray assembly to determine how much flow is needed to go to the spray section 328. As such, the first controller may control the speed of the second pump 318 in order to achieve the necessary flow to the nozzles 330.

Moreover, the first controller may control the state of the one or more nozzles 330. For example, the first controller may control the one or more nozzles 330 between an open or active state and a closed or inactive state. Thus, the first controller may control the amount of flow pumped to the spray section 338 as well as which nozzles 330 are active for spraying the product.

When a product has a tendency to settle, the first controller may also control the position of the agitation valve. Product may therefore be pumped into the agitation system to remove or limit any "dead spots" in the second system 304 (e.g., the second "dead spot" 800 and fourth "dead spot" 802). The first controller therefore may be configured for controlling the state of the agitation system.

In some implementations, the first controller may also control the functionality of the various valves and agitation system in the first system 302. In another implementation, a second controller may be used to control the first system 302. For example, the second controller may be a primary solution system controller ("PSSC"). The second controller may control the position of the first sump valve 310, the output of the first pump 312, and the position of the first agitation valve 314. In some implementations, the second controller may control the state of one or more of the nozzles 330 configured to receive product from the first system 302. In several implementations, the first and second controllers may communicate to one another as to which of the one or more nozzles will be open or closed. In some implementations, the first and second controllers may communicate with one another as to which of the one or more nozzles will receive product from the first system 302 or second system 304. In other implementations, a first plurality of nozzles 330 may be configured to receive product from the first system 302 and a second plurality of nozzles 330 may be configured to receive product from the second system 304.

In one implementation, either the first or second controller may communicate with the equalizing valve 352 to control its position relative to the first and second systems. In yet other implementations, there may be other controllers which control one or more of the valves, pumps, and nozzles in the multi-tank delivery system 300. In a further implementation, one controller may control output from the rinse tank 326 by controlling the position of the first rinse valve 362 and second rinse valve 364. This controller may be the first controller, the second controller, or a different controller. In some implementations, the first controller, second controller, or any other controller may be part of the tank module 210 as described above with respect to FIG. 2.

Figure 17A:
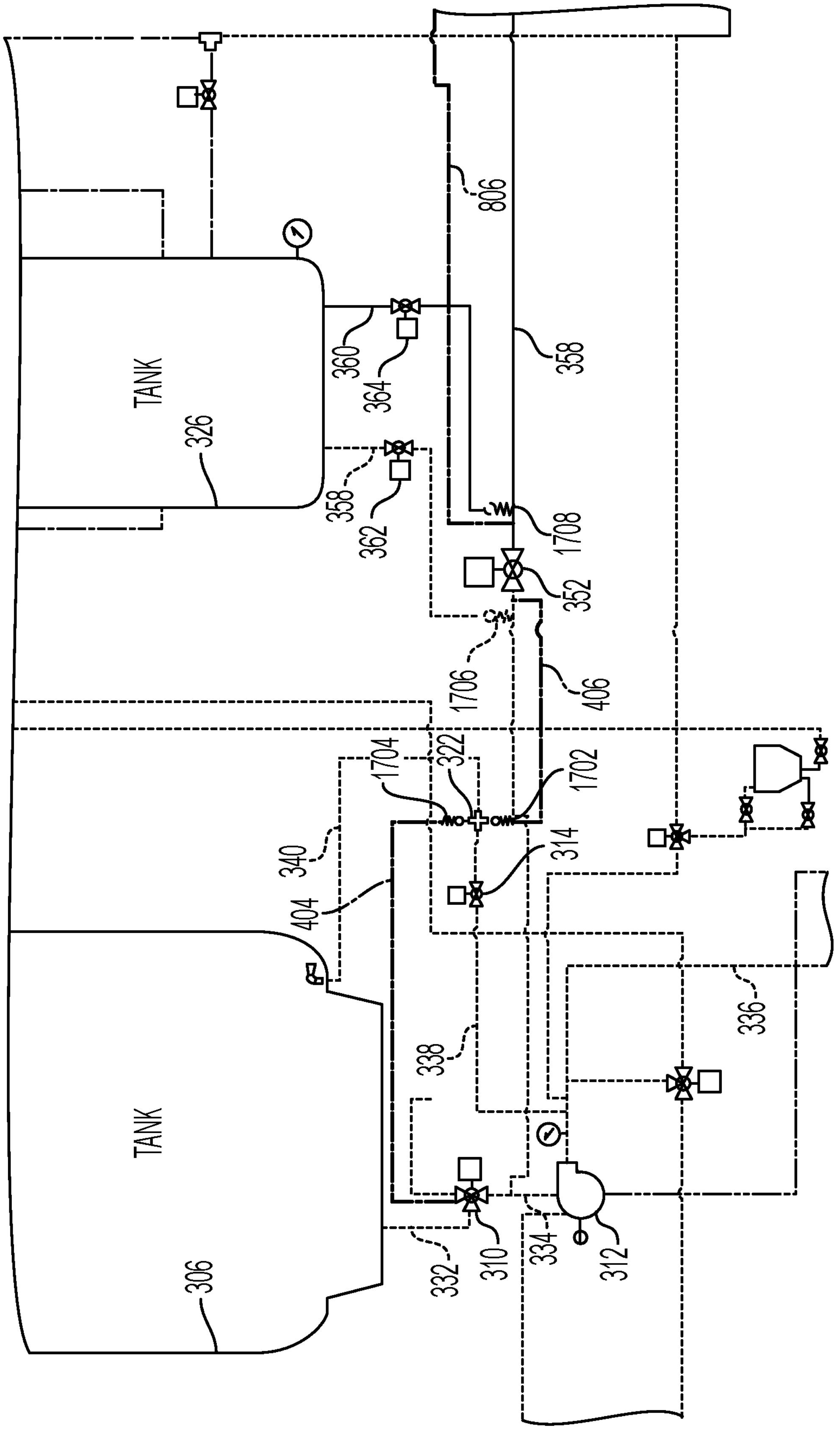
FIGS. 17A-B are schematic diagrams of a first and second portion of another example implementation of a multi-tank delivery system.
Figure 17B:
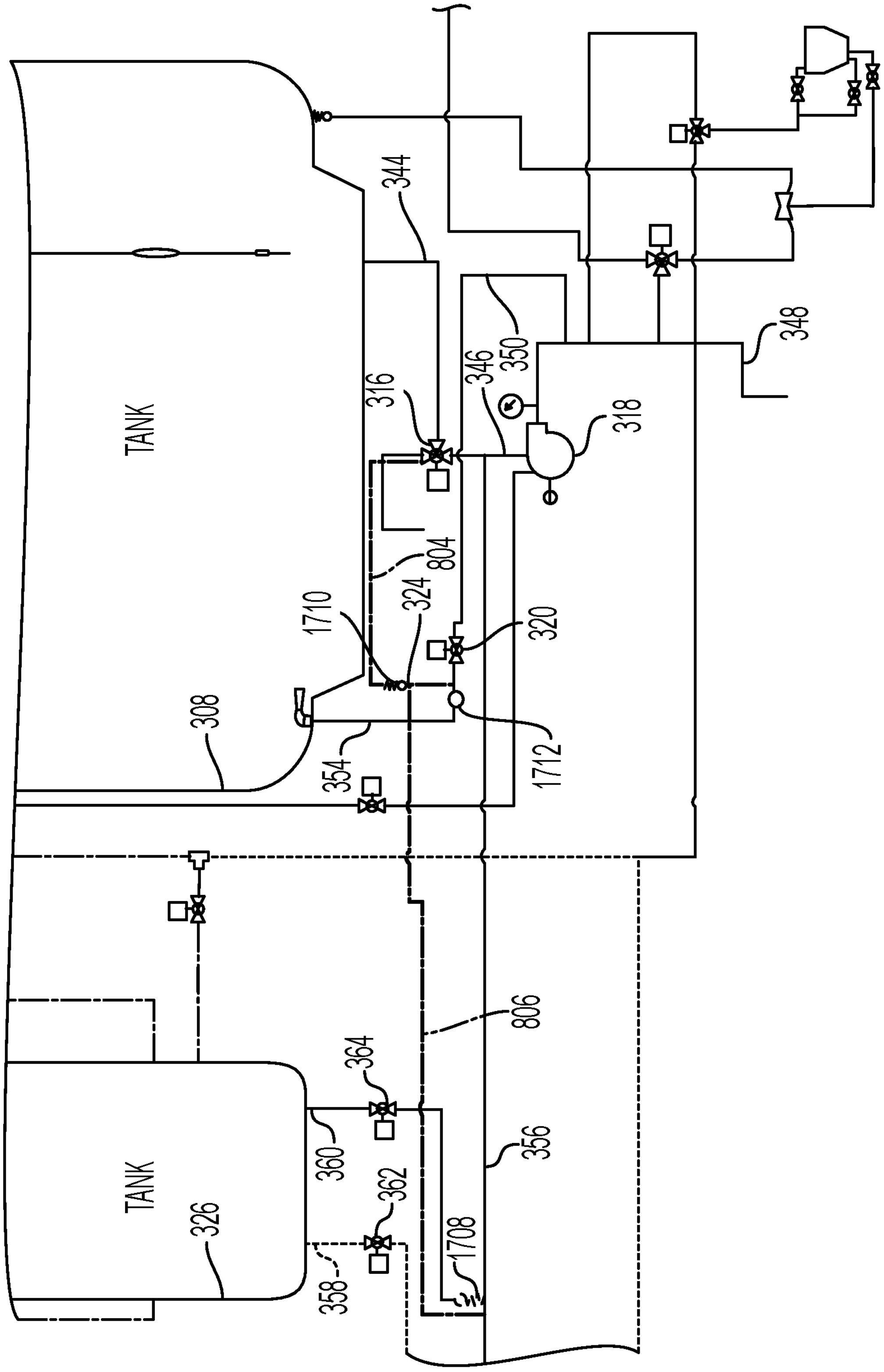

In this disclosure, additional valves may be located in the various lines of the multi-tank product delivery system. Some of these valves may be controlled via one or more controllers. In FIGS. 17A-B, another implementation of a multi-tank product delivery system 1700 is shown. In the system 1700, the tanks, sump valves, pumps, agitation systems, and fluid lines are given similar reference numbers as described above. In this multi-tank product delivery system 1700, a plurality of check valves are disposed within one or more of the fluid lines. In FIG. 17A, for example, a first check valve 1702 and a second check valve 1704 are located on different sides of the first breakout portion 322. The first and second check valves 1702, 1704 are configured to prevent fluid flowing in a reverse direction. Thus, the valves are located in the different fluid lines to ensure or maintain fluid flow in a single direction through the corresponding fluid line. For example, the first check valve 1702 may be configured to ensure a single direction fluid flow through the first agitation line 404 and the second check valve 1704 may be configured to ensure a single direction fluid flow through the fifth line 340.

In FIGS. 17A and B, a third check valve 1706 and a fourth check valve 1708 may be incorporated into the first and second rinse lines 358, 360, respectively.

In FIG. 17B, a fifth check valve 1710 and a sixth check valve 1712 may be incorporated in the various fluid lines to maintain single direction fluid flow. For example, the fifth check valve 1710 may be incorporated into the first agitation line 804 and the sixth check valve 1712 may be incorporated into the eleventh line 354. Although not shown, additional check valves as well as other types of valves (e.g., electrically-actuated valves, electromechanical valves, hydro-mechanical valves, hydro-electrical valves, pneumatic valves, etc.) may be located in other fluid lines in the system 1700.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 122(f) unless an element is expressly recited using the phrase "means for," or in the case of a method claim using the phrases "operation for" or "step for."

While exemplary implementations incorporating the principles of the present disclosure have been described herein, the present disclosure is not limited to such implementations. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A multi-tank system for delivering product to a spray section, comprising:

a first tank configured to contain a first product;

a second tank configured to contain a second product;

a first pump;

a plurality of valves including a first sump valve, a second sump valve, an equalizing valve, and an agitation valve, wherein a first end of the first sump valve is in fluid communication with the first tank, a second end of the first sump valve is in fluid communication with (i) a first end of the equalizing valve and (ii) an inlet of the first pump, a first end of the second sump valve is in fluid communication with the second tank, and a second end of the second sump valve is in fluid communication with a second end of the equalizing valve;

a plurality of fluid lines including a first fluid line and a second fluid line, wherein (i) the first fluid line is fluidly coupled between an outlet of the first pump and a first end of the agitation valve and (ii) the second fluid line is fluidly coupled between a second end of the agitation valve and the first tank; and a third fluid line directly fluidly coupled at one end to either the first fluid line or the second fluid line and at another end to the first sump valve or the first end of the equalizing valve.

2. The system of claim 1, wherein the third fluid line is directly fluidly coupled to the first fluid line.

3. The system of claim 1, wherein the third fluid line is directly fluidly coupled to the second fluid line.

4. The system of claim 1, wherein the third fluid line is fluidly coupled to a fourth fluid line, the third fluid line being fluidly coupled to the first sump valve and the fourth fluid line being fluidly coupled to the first end of the equalizing valve.

5. The system of claim 1, wherein the agitation valve is operably controlled between a first position and a second position, where in the first position the third fluid line is fluidly coupled to the outlet of the first pump and in the second position the third fluid line is fluidly decoupled from the outlet of the first pump.

6. The system of claim 1, further comprising a controller disposed in communication with each of the plurality of valves, the controller configured to actuate each of the plurality of valves between an open position and a closed position.

7. The system of claim 1, wherein:

the plurality of valves comprises a second agitation valve the plurality of fluid lines including a fifth fluid line and a sixth fluid line, wherein (i) the fifth fluid line is fluidly coupled between an outlet of a second pump and a first end of the second agitation valve and (ii) the sixth fluid line is fluidly coupled between a second end of the second agitation valve and the second tank;

a seventh fluid line fluidly coupled at one end to either the fifth fluid line or the sixth fluid line and at another end to the second sump valve or the second end of the equalizing valve.

8. The system of claim 7, wherein the seventh fluid line is fluidly coupled to an eighth fluid line, the seventh fluid line being fluidly coupled to the second sump valve and the eighth fluid line being fluidly coupled to the second end of the equalizing valve.

9. The system of claim 1, wherein the first sump valve, comprises:

a body forming a cavity configured to receive fluid, the body including an inlet and an outlet;

a control portion and a ball, the ball located in the cavity and configured to be moved relative to the body via the control portion;

a fluid port coupled to the body and spaced from the inlet and the outlet, the fluid port configured to be fluidly coupled to the third line;

wherein, the inlet and outlet are configured to be fluidly coupled to the first tank;

wherein, the control portion is configured to move the ball between at least a first position and a second position, where in the first position the inlet is closed from receiving a fluid from the first tank and in the second position the inlet is open for receiving fluid from the first tank;

wherein, the fluid port is oriented with respect to the body so that it is configured to inject a pressurized fluid into the cavity independent of the position of the ball.

10. The valve of claim 9, wherein:

the body forms a lower portion of the cavity;

the fluid port is oriented with respect to the body in which the fluid port is configured to inject pressurized fluid directly into the lower portion of the cavity.

11. The valve of claim 10, wherein the fluid port is located in the lower portion of the cavity.

12. The valve of claim 10, wherein the fluid port is angled relative to the body towards the lower portion of the cavity.

13. The valve of claim 9, wherein the fluid port is located in a side wall of the body and is configured to inject the pressurized fluid in a direction that is 90° or less relative to a direction of fluid received in the inlet.

* * * * *